US006941302B1

(12) United States Patent
Suchter

(10) Patent No.: US 6,941,302 B1
(45) Date of Patent: *Sep. 6, 2005

(54) MANAGING CHANGES TO A DIRECTORY OF ELECTRONIC DOCUMENTS

(75) Inventor: Sean A. Suchter, San Mateo, CA (US)

(73) Assignee: Inktomi Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/641,433

(22) Filed: Aug. 14, 2003

Related U.S. Application Data

(63) Continuation of application No. 09/305,684, filed on May 4, 1999, now Pat. No. 6,675,161.

(51) Int. Cl.[7] .......................... G06F 17/30; G06F 7/00
(52) U.S. Cl. ........................ 707/5; 707/101; 707/102
(58) Field of Search ........................................ 707/1–5

(56) References Cited

U.S. PATENT DOCUMENTS

| | | | |
|---|---|---|---|
| 5,442,778 A | 8/1995 | Petersen et al. ................ 707/5 |
| 5,463,773 A | 10/1995 | Sakakibara et al. ......... 707/102 |
| 5,537,586 A | 7/1996 | Amram et al. .................. 707/3 |
| 5,544,360 A | 8/1996 | Lewak et al. ................... 707/1 |
| 5,611,049 A | 3/1997 | Pitts ............................... 707/8 |
| 5,634,051 A | 5/1997 | Thomson ....................... 707/5 |
| 5,812,995 A | 9/1998 | Sasaki et al. ................... 707/1 |
| 5,819,258 A * | 10/1998 | Vaithyanathan et al. ....... 707/2 |
| 5,884,075 A | 3/1999 | Hester et al. ................ 713/100 |
| 6,038,560 A | 3/2000 | Wical ............................. 707/5 |
| 6,085,234 A | 7/2000 | Pitts et al. .................. 709/217 |
| 6,154,213 A | 11/2000 | Rennison et al. ........... 345/854 |
| 6,185,550 B1 * | 2/2001 | Snow et al. .................... 707/1 |
| 6,216,134 B1 | 4/2001 | Heckerman et al. ...... 707/104.1 |
| 6,295,533 B2 | 9/2001 | Cohen ............................ 707/5 |
| 6,308,179 B1 | 10/2001 | Petersen et al. ............ 707/102 |
| 6,389,436 B1 | 5/2002 | Chakrabarti et al. ........ 715/513 |
| 6,430,575 B1 * | 8/2002 | Dourish et al. ............. 707/200 |

(Continued)

OTHER PUBLICATIONS

Dourish, P., W.K. Edwards, A. LaMarcha and M. Salisbury "Presto: An Experimental Architecture for Fluid Interactive Documen Spaces", ACM Transactions on Computer-Human Interaction, vol. 6, No. 2, pp. 133-161, Jun. 1999.*

(Continued)

*Primary Examiner*—Luke S Wassum
(74) *Attorney, Agent, or Firm*—Marcel K. Bingham; Hickman Palermo Truong & Becker LLP

(57) ABSTRACT

A method and apparatus are provided for managing changes to a directory of electronic documents. A custom directory is created and stored based on the contents of a master directory. The master directory comprises a taxonomy of categories. A plurality of electronic documents are classified in one or more of the categories. One or more mappings defines how the documents of categories of the master directory map to categories of the custom directory. Mappings may express merges or splits of categories. One or more judgments may be created and stored in the custom directory in association with documents in the categories of the custom directory. Each judgment expresses whether a document is in or not in a category, or locked out of all categories. Modifications to the master directory are automatically propagated to the custom directory, according to the mapping, but without overriding the judgments in the custom directory.

50 Claims, 13 Drawing Sheets

U.S. PATENT DOCUMENTS

| | | | |
|---|---|---|---|
| 6,562,076 B2 * | 5/2003 | Edwards et al. | 715/515 |
| 6,675,161 B1 * | 1/2004 | Suchter | 707/5 |
| 6,701,333 B2 * | 3/2004 | Suermondt et al. | 707/204 |
| 2002/0055958 A1 | 5/2002 | Edwards et al. | 715/514 |
| 2002/0099710 A1 | 7/2002 | Papierniak | 707/100 |
| 2002/0178223 A1 | 11/2002 | Bushkin | 709/205 |

OTHER PUBLICATIONS

Dourish, P., J. Lamping and T. Rodden, "Building Bridges: Customisation and Mutual Intelligibility in Shared Category Management", Proceedings of the ACM Conference on Supporting Group Work (GROUP 99), pp. 11-20, Nov. 14-17, 199.*

Lawrie, D. and Croft, W.B. "Discovering and Comparing Topic Hierarchies", Proceedings of the 6th Conference on Content-Based Multimedia Information Access (RIAO 2000), Apr. 12-14, 2000, pp. 314-330.

Bentley, R. and P. Dourish "Medium Versus Mechanism: Supporting Collaboration through Customisation", Proceedings of the 4th European Conference on Computer-Supported Cooperative Work (ECSCW'95), 1995.

Wulf, V. "Storing and Retrieving Documents in a Shared Workspace: Experiences from the Political Administration", Proceedings of the International Conference on Human-Computer Interaction (INTERACT 97), pp. 469-476, Jul. 14-18, 1997.

Gutwin, C. and S. Greenberg "Design for Individuals, Design for Groups: Tradeoffs Between Power and Workspace Awareness", Proceedings of the Conference on Computer-Supported Cooperative Work (CSCW 98), pp. 207-216, Nov. 14-18, 1998.

Simone, C., G. Mark and D. Giubbilei "Interoperability as a Means of Articulated Work", Proceedings of the International Conference on Work Activites Coordination and Collaboration (WACC 99), pp. 39-48, Feb. 22-25, 1999.

Dourish, P., W.K. Edwards, A. LaMarcha and M. Salisbury "Presto: An Experimental Architecture for Fluid Interactive Document Spaces", ACM Transactions on Computer-Human Interaction, vol. 6, No. 2, pp. 133-161, Jun. 1999.

Dourish, P., W.K. Edwards, A. LaMarcha and M. Salisbury "Using Properties for Uniform Interaction in the Presto Document System", Proceedings of the 12th Annual ACM Conference on User Interface Software and Technology (UIST 99), Nov. 7-10, 1999.

Dourish, P., J. Lamping and T. Rodden, "Building Bridges: Customisation and Mutual Intelligibility in Shard Category Management", Proceedings of the ACM Conference on Supporting Group Work (GROUP 99), pp. 11-20, Nov. 14-17, 1999.

Morris, S. "Document Management", downloaded from <guir.Berkeley.edu/course/cscw/fall2001/lectures>, Nov. 15, 2001.

Dourish, P. "The Appropriation of Interactive Technologies: Some Lessons from Placeless Documents", Computer-Supported Cooperative Work, Special Issue on Evolving Use of Groupware, 2001.

* cited by examiner

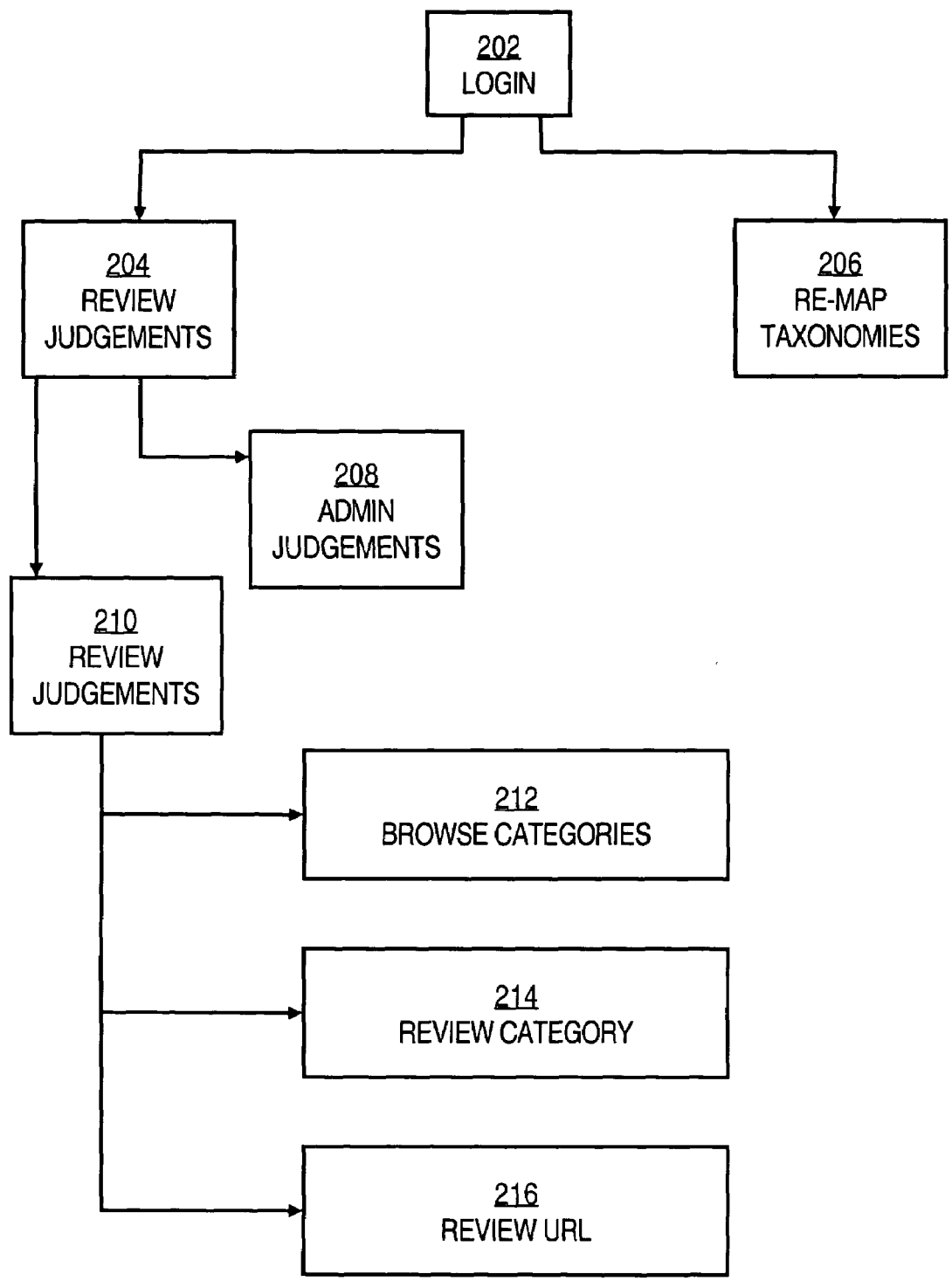

MANAGING CHANGES TO A DIRECTORY OF ELECTRONIC DOCUMENTS

RELATED APPLICATIONS

This application is a continuation of and claims priority to U.S. application Ser. No. 09/305,684, entitled "Managing Changes to a Directory of Electronic Documents", filed on May 4, 1999 now U.S. Pat. No. 6,675,161 by Sean A. Suchter, the contents of which are incorporated herein by reference.

FIELD OF THE INVENTION

The present invention generally relates to data processing. The invention relates more specifically to managing directories of electronic documents that are used, for example, in a large hypertext document system.

BACKGROUND OF THE INVENTION

Hypertext systems are widely used. One particular hypertext system, the World Wide Web ("Web"), provides global access over public packet-switched networks to a large number of hypertext documents. The Web has grown to contain a staggering number of documents, and the number of documents continues to increase. The Web has been estimated to contain several hundred million pages and is expected to expand rapidly over the foreseeable future.

The number of documents available through the Web is so large that to use the Web in a practical way almost always requires a search service, search engine, or similar service. The search engines use "spider" programs that "crawl" to Web servers around the world, locate documents, index the documents, and follow hyperlinks in those documents to yet other documents. In one mode of operation, a user provides a search query to the search engine, which locates information in the index about responsive documents and displays a set of search results that satisfy the query.

In another mode of operation, the index may be organized in the form of a hierarchical directory that is structured using a taxonomy of categories. The search engine displays a top-level set of categories from the taxonomy. Each category is hyperlinked to one or more subordinate categories that are associated with that category. Each category may also be associated with one or more documents that fall within that category. In that case, the search engine also displays a list of the documents. A user may browse the taxonomy and the underlying directory by selecting successive categories until a category of interest is reached, or may select a document associated with a particular category. This mode of operation is available using the search engine "Disney's Internet Guide" (DIG), which is accessible online at www.dig.com.

In this field, separate enterprises or companies may own and operate the search engine and the technology that is used to create and manage the underlying directory (the "master directory"). Different search engine operators may wish to provide a taxonomy to their end users that is different from the standard taxonomy that is reflected by the master directory. Also, various search engine operators may wish to classify a particular document in a category that is different from that in which it is classified in the master directory. Thus, there is a need to enable different search engine operators to establish different, customized underlying directories.

A search engine operator with a customized directory, however, normally will still want to receive updates to the master directory issued by the owner of the directory technology. Thus, there is a need to integrate the updates into the customized directory in a way that does not override or disrupt the customizations that are reflected in the customized directory.

There is also a need for a system or mechanism that provides a convenient way to create and store a custom directory based on a master directory, in which the custom directory has a custom taxonomy that is different from the taxonomy of the master directory.

There is also a need for such as system or mechanism in which the custom taxonomy classifies documents in different categories or according to custom judgments that differ from or conflict with corresponding judgments in the master directory.

There is also a need to integrate the updates into the customized directory in a way that does not override or disrupt the custom judgments that are reflected in the customized directory.

SUMMARY OF THE INVENTION

The foregoing needs and objects, and other needs and objects that will become apparent from the following description, are achieved by the present invention, which comprises, in one aspect, a method of managing changes to a directory of electronic documents, comprising the steps of creating and storing a first directory of the electronic documents having a hierarchy of one or more categories into which one or more of the electronic documents are classified; creating and storing a second directory that is based on the first directory, one or more customizations that represent differences between hierarchies of the first directory and the second directory, and one or more judgments that represent whether one or more of the electronic documents are properly classified in the categories; modifying the first directory by changes to one or more of the categories; and automatically propagating the changes to the second directory, without modifying the customizations or the judgments, to thereby create and store a modified second directory.

One feature of the invention involves creating and storing the first directory of the electronic documents that is defined by a hierarchy of one or more categories into which one or more of the electronic documents are classified and by one or more master judgments that represent whether one or more of the electronic documents are properly classified in the categories; modifying the first directory by changes to one or more of the master judgments; and automatically propagating the changes to the second directory, without modifying the customizations or the judgments, to thereby create and store a modified second directory.

Another feature relates to creating and storing one or more judgments of the second directory by the steps of displaying a taxonomy of categories of the second directory; receiving a selection of one of the categories; displaying one or more judgments associated with one of the electronic documents in the selected category; and receiving and storing a quality value that defines how closely the one of the electronic documents matches the selected category. In another feature, creating and storing the second directory includes creating and storing the second directory based on the first directory and one or more customizations that reflect a merge of a plurality of the categories of the first directory to one of the categories of the second directory.

According to another feature, creating and storing the second directory includes the step of creating and storing the second directory based on the first directory and one or more customizations that reflect a split of one of the categories of the first directory into a plurality of the categories of the second directory. A related feature involves creating and storing a new judgment in the second directory, wherein the new judgment indicates that a particular electronic document is in one of the categories of the second directory. Another feature is that the new judgment indicates that a particular electronic document is not in one of the categories of the second directory. Still another feature is that the new judgment indicates that a particular electronic document is locked out of all categories of the second directory.

In another feature, the method comprises marking the new judgment as un-reviewed; and receiving an acceptance signal indicating that the new judgment is accepted, and in response thereto, persistently storing the new judgment in the second directory. A related feature involves receiving a rejection signal indicating that the new judgment is rejected, and in response thereto, modifying the new judgment to indicate that the electronic document is not in the category.

According to still another feature, the method includes integrating the customizations and judgments into the second directory by identifying in the customizations to the first directory, each mapping of a source category of the first directory to a destination category of the second directory; copying each judgment that is in the source category to the destination category; and marking as un-reviewed, each judgment that is copied to the destination category and that originates from a split mapping of the source category.

In another feature, the method marks as un-reviewed, each judgment that is copied to the destination category and that originates from an un-reviewed judgment in the source category.

According to another feature, the method further comprises the step of creating and storing one or more custom judgments that are associated with the second directory, wherein the custom judgments have a judgment type value selected from among "in category," "not in category," "exclude from all categories", and "undo exclude from all categories"; and integrating each of the custom judgments into the second directory by overriding any conflicting judgment originating from the first directory. A related feature is that the integrating is carried out such that: judgments of lower priority cannot affect earlier judgments of higher priority; "in" judgments override previous "in" and "not in" judgments; "not in" judgments override previous "in" and "not in" judgments; "exclude from all categories" judgments override previous "in" judgments; and "undo exclude from all categories" judgments override previous "exclude from all categories" judgments.

The invention also encompasses an apparatus and a computer-readable medium that may be configured to implement the foregoing.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram of judgment functions that may be provided by a directory;

DETAILED DESCRIPTION OF THE PREFERRED EMBODIMENT

A method and apparatus for managing changes to a directory of electronic documents is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In still other instances, certain specific terms are used by way of example, but the invention or any particular embodiment is not limited to implementation using structures or functions that are identified by such specific terms. For example, in the following discussion it proves convenient to use the term Universal Resource Locator (URL) to refer to an identifier of an electronic document. However, any identifier of any kind of electronic document may be used, including file names, abstract names, numbers, etc., represented in computer memory or data structures, and the equivalents of any of the foregoing.

Operational Context

An embodiment of the invention may be implemented in the context of a search-and-retrieval system for electronic documents. The preferred embodiment is implemented in the context of a search engine system that forms a part of the World Wide Web.

A search engine may operate in conjunction with a cache. Generally, a Web cache is a software system that attempts to deliver recently visited Web pages from a high-speed memory storage area rather than from the original source of the Web pages, which may be slow, unavailable, or distant. An example of a carrier-class Web cache is Traffic Server, which is commercially available from Inktomi Corporation, San Mateo, Calif. Traffic Server currently is in commercial use by America Online (AOL), which is the largest Internet Service Provider (ISP) in the world.

Figure 1A:
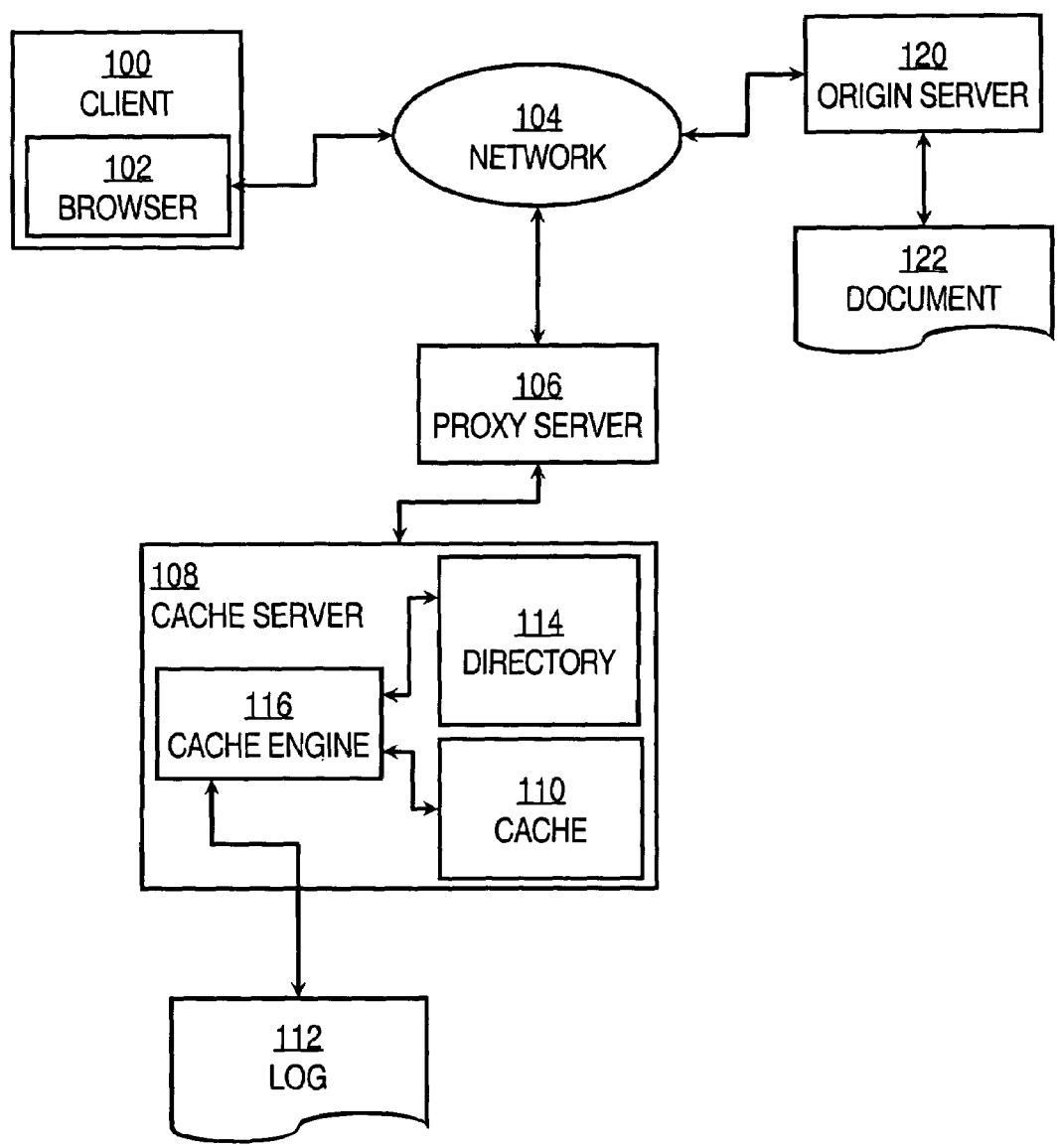
FIG. 1A is a block diagram of a search engine system.

FIG. 1A is a block diagram of the general architecture of a hypertext document cache system. Client 100, which is an end station of a network such as a workstation or personal computer, executes a browser 102. The browser 102 is a software element that can request hypertext documents from a server, interpret the source language in which the hypertext documents are encoded, and display the hypertext documents. Examples of commercial products that are suitable for use as browser 102 are Netscape Navigator and Microsoft Internet Explorer. Browser 102 is logically coupled to network 104, which may be a local area network (LAN), wide area network (WAN), an internetwork, or a plurality of any of the foregoing. An origin server 120, which manages a master copy of a hypertext document 121, is coupled to network 104 logically opposite from the network.

Proxy server 106 is also coupled to the network 104 and is logically addressable through the network. A cache server 108 is coupled to proxy server 106. Cache server 108 may comprise a cache engine 116 coupled to a directory 114 and a cache 110. Cache server 108 generates a log 112 during its operation. Proxy server 106 and cache server 108 may be co-located, for example, at a computing facility of an ISP. The cache server 108 may be implemented using the Traffic Server product identified above.

In operation, browser 102 executes at client 100. A user of the client 100, or an agent executing in the client, generates a request to retrieve a hypertext document according to a particular location identifier. For example, a Web browser of the client may request a Web document using its URL, such as "www.inktomi.com". Browser 102 submits the request to network 104. Using a domain name service or similar network element, network 104 determines the location of the origin server 120 that contains the requested document. The origin server 120 redirects all incoming requests for hypertext documents to the proxy server 106. Proxy server 106 redirects all incoming requests to the cache server 108. The cache server 108 determines whether the requested document is in the cache 110. If it is, the cache server 108 delivers the requested document to the browser 102 from the cache 110. Thus, normally, all Web traffic directed at origin server 120 passes through the cache server 108.

As part of its normal operation, the cache creates and stores one or more logs, including log 112, which contain a record for each document request. Each log may be implemented as a file stored in a file system on a non-volatile storage file, a list in memory, or any other appropriate data structure or information storage mechanism.

Master Directory and Customized Directory

Directory 114 is an index of the documents in the cache 110. Alternatively, directory 114 indexes all documents that are available using network 104. Directory 114 may be organized according to a taxonomy of categories that classify electronic documents by subject matter, technical field, etc. An example of a commercial search engine that supports a directory-driven search is the DIG search engine.

The "home page" of the DIG search engine comprises a top-level list of document categories such as "Animals & the Outdoors," "News & the World," "Games & Toys," and others. Each category is represented by a text label that is a hyperlink. When a category is selected, a subordinate list of categories is displayed, in which each sub-category is also a hyperlink. For example, selecting category "Animals & the Outdoors" generates a display of the form shown in Table 1.

TABLE 1

SUB-CATEGORY DIRECTORY DISPLAY

Category: Animals & the Outdoors

| Aquatic Life | Frogs |
|---|---|
| Beaches | Gardening |
| Bears | Hiking |
| Big Cats | Horses |
| Birds | Mammals |
| Boating | National Parks |
| Bugs | Pets |
| Camping | Primates |
| Cats | Reptiles |
| Dogs | Scouting |
| Endangered Species | Strange Mammals |
| Farm Animals | Zoos |

Each sub-category comprises a text label, which is a hyperlink, followed by a parenthetical value that identifies the number of documents contained within that sub-category. When a lowest-level category is reached, a list of documents within that category is displayed, as shown in Table 2.

Table 2—Document List 1.
http://www.barbados.org/beachimg.htmhttp://www.barbados.org/beachimg.htm
Barbados beaches—the beaches photo gallery
Photo Gallery of beautiful Barbados beaches. Discover the golden sand beaches of this Caribbean island!
Category: Animals and the Outdoors:Beaches
2.
http://www.sunsets.com/beaches.htmhttp://www.sunsets.com/beaches.htm
Beaches on Ontario's Lake Huron Shoreline
Lake Huron Shoreline Beaches. Lake Huron, Bruce County, Ontario, Canada. Check out our spectacular beaches in Kincardine, Port Elgin, Southampton, Sauble Beach and Paisley!
Category: Animals and the Outdoors:Beaches Each document in the list includes a hypertext link to the online site of the enterprise that owns the origin copy of the document.

The information in the foregoing displays is derived by the search engine from a master directory of electronic documents that is created, stored, and executed on one or more servers that are associated with the search engine. The master directory comprises a plurality of nodes organized in the form of a hierarchical tree. Each node of the tree represents a category and zero or more electronic documents that are associated with that category. Each node stores: the name of the category associated with the node; a node identifier uniquely associated with the node; a list of one or more subordinate node identifiers that are located below the current category; and a list of one or more document identifiers of electronic documents within the category represented by the current node.

Electronic documents are assigned to categories and nodes in an offline operation, before the directory is available to the search engine. In one embodiment, the master directory is created and populated with electronic documents based on the results of a Web crawler. The owner or operator of the master directory uses a crawler program to continuously re-crawl the Word Wide Web. References to new documents are stored in a list of unclassified documents.

Periodically, the list of unclassified documents is scanned, judgments are made about the content of the documents, and the unclassified documents are assigned to categories. Assignment of a document to a category may involve creating a new category in the directory. This process may be carried out by manual scanning and review of the unclassified documents, or by an automatic review process. This process maintains the freshness and quality of the directory.

Figure 1B:
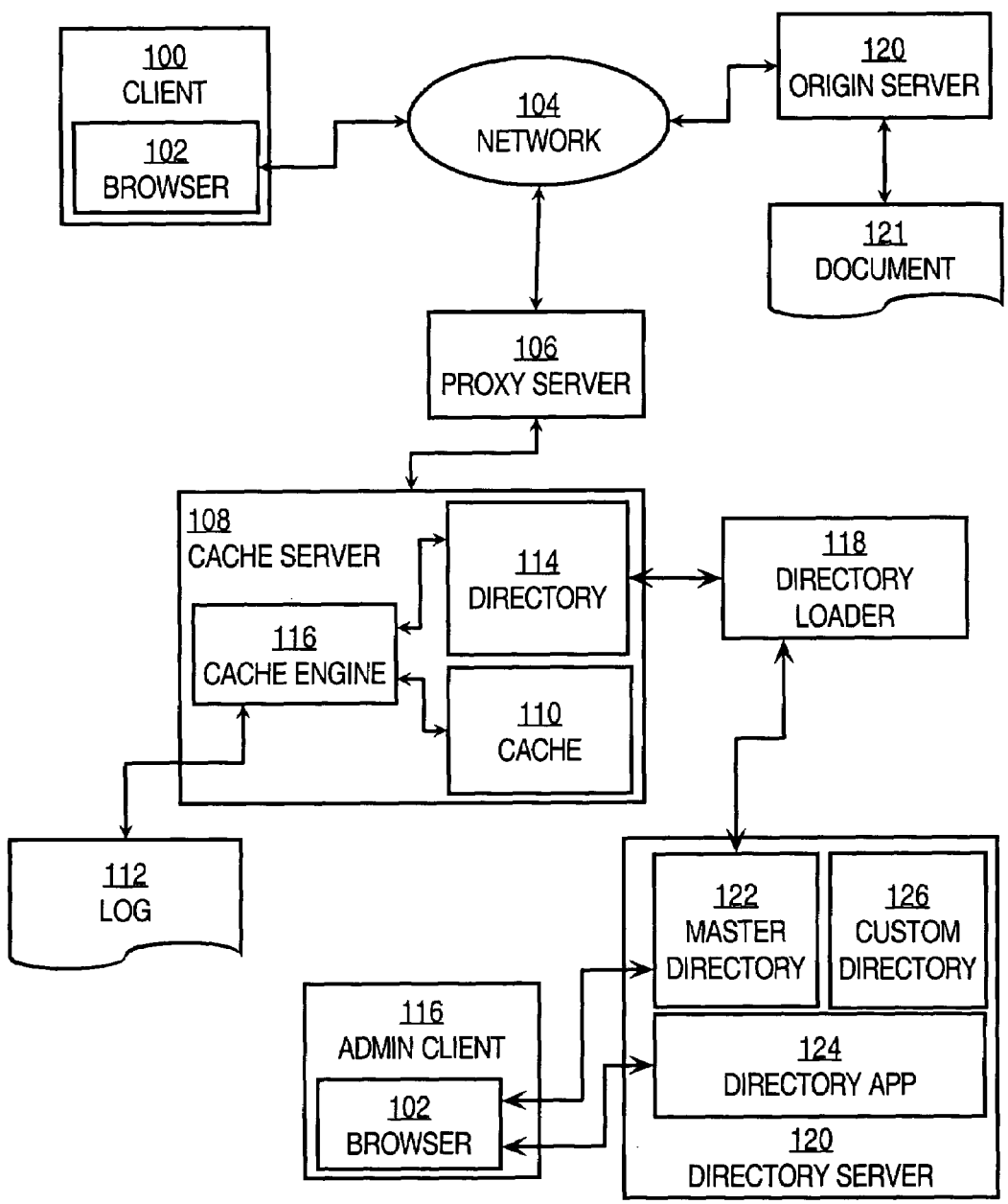
FIG. 1B is a block diagram of a search engine system that supports creation of a customized directory.

FIG. 1B is a block diagram of a search engine system that further comprises a directory server 120 that hosts a master directory 122, a custom directory 126, and a directory application 124. Master directory 122 is a reference version of a directory and may be created by the owner or operator of a search service. Custom directory 126 has the same general structure as the master directory. The structure of customized directory 126, however, is defined by information defining a mapping of one or more nodes of the master directory to one or more nodes of the customized directory, and by information defining one or more judgments about electronic documents in the directory.

Directory application 124 is used to define and create custom directory 126 based on master directory 122. Periodically, when custom directory 126 is completed and is ready for online, "live" production use, custom directory 126 may be loaded into cache server 108 by directory loader 118. This process ensures that custom directory 126 is edited offline and made available for live use in an orderly manner.

Master directory 122 and custom directory 126 each may comprise one or more database tables and a database server. Alternatively, master directory 122 and custom directory 126 may access a common database server. What is important is that master directory 122 and custom directory 126 have access to an organized, persistent storage location for the information that resides within the directories.

Directory Application

In one embodiment, custom directory 126 is defined using an administrative client 116 that executes a browser 102. Directory application 124 is a software element that may be executed by administrative client 116. In the preferred embodiment, directory application 124 is a Java® program that is communicated from directory server 120 to administrative client 116. A Java virtual machine integrated into browser 102 may execute directory application 124. A description of the Java programming language and its uses appears in Arnold & Gosling, "The Java Programming Language" (Reading, Mass.: Addison-Wesley Pub. Co., 1996), and wwwjava.sun.com. Further information on the use of computer program code to implement an embodiment is given below in the section entitled "Hardware Overview."

FIG. 2A is a block diagram of functions that may be provided by directory application 124. To gain access to substantive functions of directory application 124, a user is required to log in, as indicated by login function 202. The login function 202 may involve prompting a user for a unique user name and password, and validating the received values against a database of authentic values.

Substantive functions of directory application 124 include a Review Judgments function 204 and a Re-map Taxonomies function 206. Directory application 124 may display a top-level menu that contains graphical buttons associated with the substantive functions. To activate a function, a user selects the graphical button associated with that function.

Processing Judgments

The Review Judgments function 204 provides a way to create, modify, or delete information relating to one or more electronic documents that are indexed in a particular category of the customized directory 126. This information is called a "judgment" because it reflects a subjective decision by the owner or operator of the customized directory about whether a particular document falls within a particular category.

In the preferred embodiment, each category is a list of electronic documents that are identified by document identifiers, such as Universal Resource Locators (URLs). The owner or operator can manually remove or reorder one or more document identifiers. The owner or operator can add document identifiers for documents that are not present in the master directory. The owner or operator may change attributes that are associated with an electronic document. For example, the owner or operator may change the rankings associated with a particular electronic document so that the document will appear lower in a list of results from the search engine. An attribute may reflect the relevance of a particular document to a particular category, and thus serves as an indication of quality or confidence that the document actually falls in that category.

Each judgment has a judgment type. Valid judgment types include IN, NOT_IN, LOCK_OUT, and NEGATE_LOCK_OUT. The judgment type IN indicates that a document is in the current category. The judgment type NOT_IN indicates that a document is not in the current category. The judgment type LOCK_OUT indicates that a document is not in any category and effectively excludes the document from the custom directory. The judgment type NEGATE_LOCK_OUT is used to "undo" a document that has been locked out.

There can be many judgments for one document. For example, one electronic document could be classified in 10 categories and would have 10 corresponding IN judgments.

Each judgment is defined by stored information. For example, the custom directory 126 may comprise a file or database table of judgment records. Each judgment record may store information identifying who created the record; information identifying when the record was made; an identifier of a source node in the customized directory; an identifier of a document in that node; and a flag indicating whether that document is in the node or not in the node.

A priority value may be stored in association with each judgment. A judgment created by the owner or operator of master directory 122 may have one pre-determined priority value. A judgment created by the owner or operator of custom directory 126 may have a different, higher priority value. Higher priorities override lower priorities. Therefore, within the custom directory 126, judgments created by the owner or operator of the custom directory will override judgments associated with the master directory when documents are mapped from the master directory to the custom directory. Within the master directory, the conflicting judgments that have been overridden are not affected.

Use of priority values in combination with the judgment type of "not in this category" provides a useful way to exclude a class of content from the custom directory 126. For example, assume that the master directory 122 includes electronic documents that include adult-oriented content. Assume further that the owner or creator of the custom directory 126 wishes to exclude all adult-oriented content from the custom directory. A user may select a category of the master directory 122 that contains such documents and create a judgment that each document of that category is not in any category of the custom directory 126. Because each such judgment is created by a user of the custom directory 126, each such judgment has a higher priority value than any conflicting judgment in the master directory. Accordingly, the user's judgments will override the judgments in the master directory, effectively removing all adult-oriented content from the custom directory 126.

When the Review Judgments function 204 is selected, directory application 124 provides two sub-functions, namely Administer Judgments function 208 and Review Judgments function 210.

Administer Judgments function 208 enables a user to carry out miscellaneous administrative functions relating to judgments. For example, an administrative user can set permissions of other users by designating which users can modify judgments. In the preferred embodiment, each user is classified according to one of three access levels. The first access level provides read-only access to judgments. The second level provides read/write access to judgments. The third level provides read/write access to judgments and administrative privileges. In an alternate embodiments, each access level also may be set for each category as well as each user. For example, there might be one user who is authorized to modify judgments only for the Travel category and all its sub-categories, another user who exclusively handles the Business category, etc.

When the Review Judgments function 210 is selected, directory application 124 displays a list of judgment collections that have been created and stored. Preferably, the list is displayed in the form of a pull-down menu that is labeled with a unique number and name for each judgment collection. A user may proceed to substantive judgment review functions by selecting one of the judgment collections. Substantive judgment review functions associated with the Review Judgments function 210 may include a Browse Categories sub-function 212, Review Category sub-function 214, and Review URL sub-function 216.

Browse Categories Sub-Function

The Browse Categories sub-function 212 provides a rapid way for a user to review the structure of the current taxonomy of categories of custom directory 126. When the Browse Categories sub-function 212 is selected, directory application 124 displays a list of categories that are currently stored in the custom directory 126. Preferably, indentation or tabulation is used to indicate the hierarchical relationship of the taxonomy.

Figure 3A:
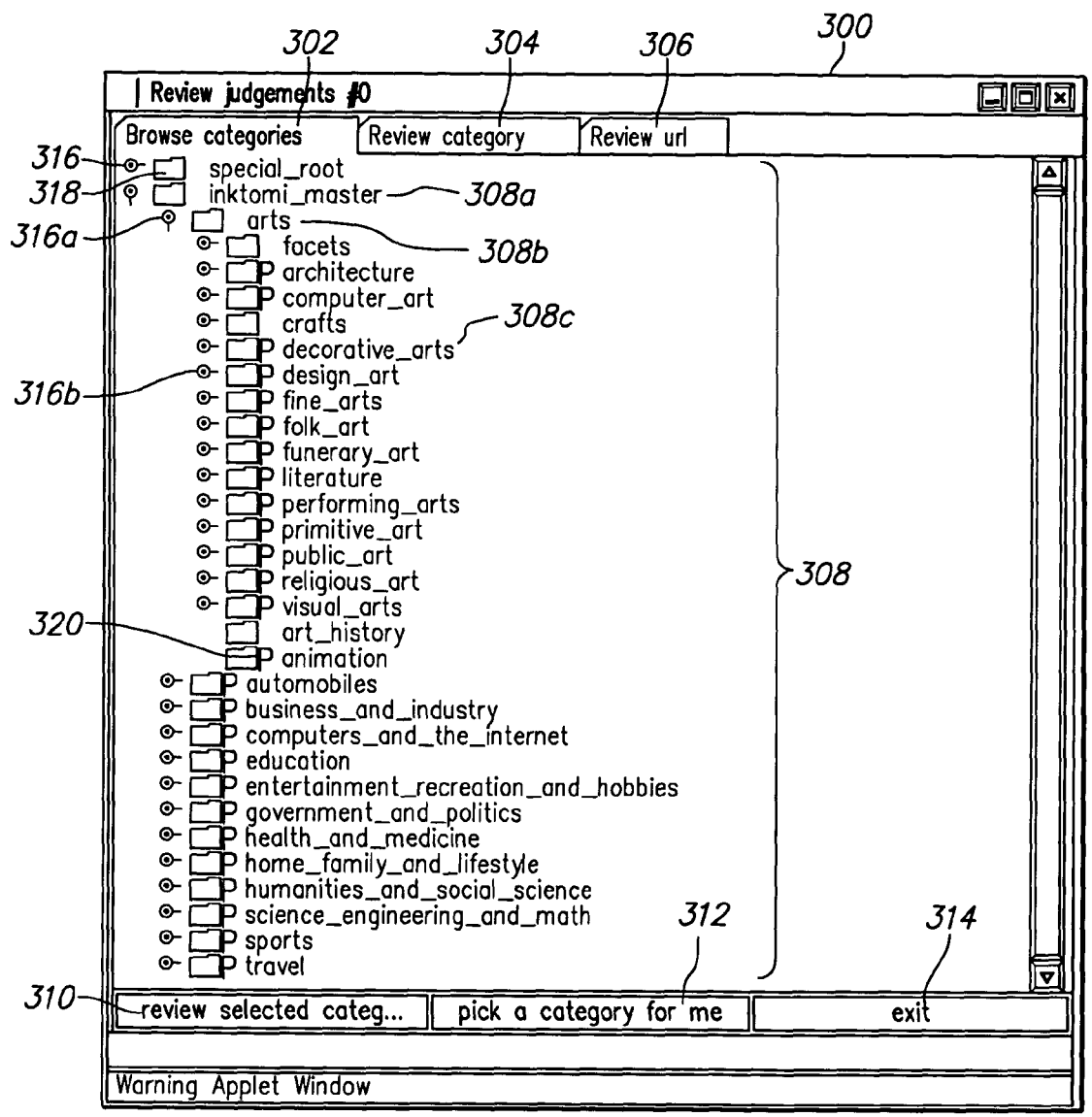
FIG. 3A is an example of a portion of a display window that includes a category taxonomy.

FIG. 3A is an example of a portion of a display window 300 that includes a category taxonomy 308. Window 300 comprises a Browse Categories tab 302, Review Category tab 304, and Review URL tab 306, which correspond to Browse Categories sub-function 212, Review Category sub-function 214, and Review URL sub-function 216, respectively. A sub-function may be activated by selecting the corresponding tab.

The taxonomy 308 is a hierarchical list of one or more categories 308a, 308b, 308c, etc. There may be any number of categories. Each category further includes an expansion icon 316, a folder icon 318, and an alphanumeric name. The expansion icon 316 indicates whether the corresponding category is displayed in expanded form, with all its child categories shown, or collapsed with all its child categories hidden. When a category is expanded, the expansion icon is displayed in expanded form, as indicated by expansion icon 316a. When a category is collapsed, the expansion icon is displayed in collapsed form, as indicated by expansion icon 316b.

Folder icon 318 is synonymous with the associated category. The folder icons provide a convenient way for a user to re-order categories. A category may be moved by dragging and dropping its associated folder icon.

Each category may also include a status tag 320, which indicates the current status of the associated category. For example, status tag 320 may have the form "P," which indicates that the associated category is "pending." A pending category is a category for which all judgments are not yet reviewed or approved.

Each taxonomy 308 may include two (2) principal nodes, which may be called the "special_root" node and the "master_directory" node. The special_root node is a root node for several special categories. The special categories serve as temporary storage locations for electronic documents that have been removed from a substantive category of the directory for various reasons. For example, the special categories may comprise a "spam" category that stores identifiers of electronic documents that have been determined to be "spam," that is, material created for advertising purposes to be classified into as many categories as possible without regard to whether the documents are appropriate to the categories; a "broken_link" category that stores identifiers of electronic documents that have been renamed by the user; identifiers of electronic documents that are invalid or contain erroneous hyperlinks; and a "server_down" category that stores identifiers of electronic documents that cannot be loaded because the associated origin server 120 is unavailable.

The master_directory node is the root node of the substantive directory. Each child node of master_directory is a category of the taxonomy represented in the directory.

The user may select any category that is displayed in the list by choosing it with a pointing device such as a mouse. Window 300 further includes a Review Selected Category button 310, a Pick A Category For Me button 312, and Exit button 314. A user may jump to the Review Category tab 304 and Review Category function 214 by selecting a category in taxonomy 308 and selecting the Review Selected Category button 310. When the Pick A Category For Me button 312 is selected, directory application 124 may automatically, randomly select a pending category and transfer control to the Review Category function 214. Alternatively, directory application 124 automatically selects the next pending category and transfers control to the Review Category function 214.

A user may discontinue working in the Review Judgments function 210 and close window 300 by selecting the Exit button 314.

Review Category Sub-Function

The Review Category sub-function 214 enables a user to display, re-order, and modify attributes of electronic documents that are classified in a particular category.

Figure 3B:
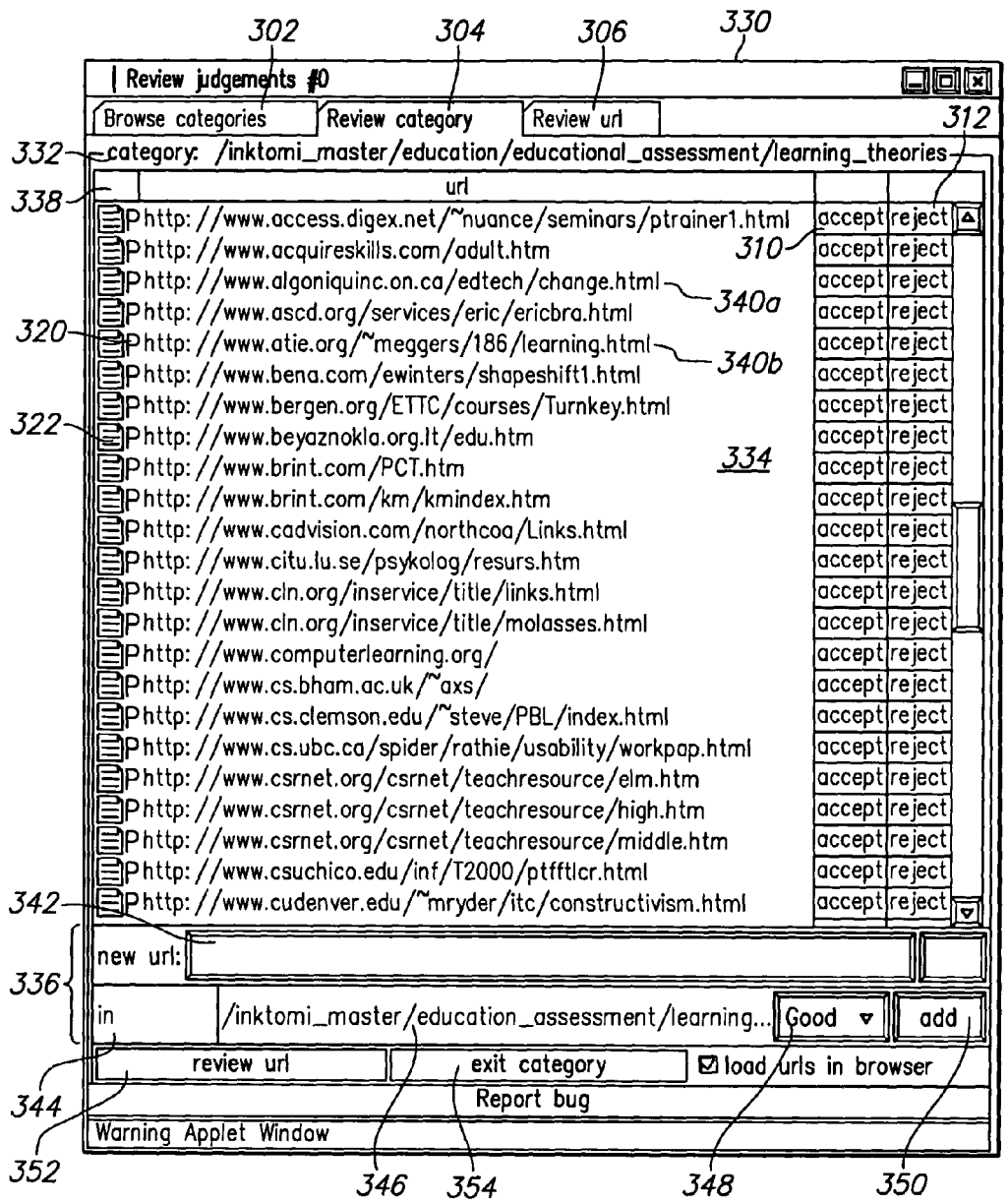
FIG. 3B is a diagram of a screen display that is displayed by a directory in response to selection of a category review function.

FIG. 3B is a diagram of a screen display 330 that is displayed by directory application 124 in response to selection of the Review Category sub-function 214. Generally, screen display 330 includes a category name field 332, document list 334, and new document pane 336.

The category name field 332 displays the name of the current category. The name of the current category corresponds to the category that was selected by the user using the Browse Categories sub-function 212. Document list 334 comprises information about zero or more electronic documents that are classified in the current category.

For each electronic document, list 334 includes status information, as indicated by status column 306. The status information comprises a graphical indication of the current status of the corresponding electronic document. For example, the status information may be "P" which indicates that judgments about a particular electronic document are pending.

List 334 also includes a link 322 and an identifier 340a, 340b. Each link 322 is a link to the associated electronic document identified by identifier 340a, 340b. Thus, a user may load and display any electronic document by selecting its link 322. In response, directory application 124 loads the associated electronic document from cache 110 or origin server 120 and redirects browser 102 to the document.

Each identifier 340a, 340b may be a URL. Each electronic document in list 334 may be selected for further operations by pointing to it using a pointing device, such as a mouse.

Screen display 300 also includes an Accept button 310 and a Reject button 312. The Accept button 310 is used to accept the information that is displayed for the currently selected electronic document. Conceptually, selecting the Accept button 310 means, for a particular electronic document, "this document belongs in this category and its judgment information is correct." The Reject button 312 is used to reject the information that is displayed for the currently selected electronic document and to enter modified information pertaining to that document. This process is described further below in the section entitled "Review URL Sub-Function."

The New URL pane 314 comprises an identifier field 342, a judgment type field 344, a category field 346, a judgment quality field 348, and an Add button 350. The New URL pane is used to add a new electronic document and associated judgment information to the list 334. In the preferred embodiment, the user selects the identifier field 342, for example, by clicking in the field with a mouse. The user types an identifier of the electronic document, such as a URL. The current category name from category name field 322 is automatically displayed in category field 346 and stored in association with the new identifier.

The user may then select a judgment type for judgment type field 344. The default judgment type is IN, which indicates that the new electronic document is "in" the current category. The user may change the judgment type to another valid judgment type (NOT_IN, LOCK_OUT, NEGATE_LOCK_OUT) by selecting judgment type field 344.

A default quality value of "3" or "Good" is automatically displayed in quality field 348 and stored in association with the new electronic document identifier. The user may change the quality value by selecting a different valid quality value by pulling down a menu in quality field 348 and selecting the value.

When the foregoing information is entered for a new electronic document, the user may store the information by selecting Add button 350.

Window 330 further includes a Review URL button 352 and Exit Category button 354. The Review URL button 352 provides a fast way for the user to jump to the Review URL sub-function 216 for a document that was newly entered in pane 336, or any selected document in list 334, without having to select the Review URL tab 306. When the Review URL button 352 is selected, directory application 124 transfers control to the Review URL sub-function 216, which is described below. The user may discontinue processing documents in the current category, and return to Browse Categories function 312, by selecting the Exit Category button 354.

Documents may be re-ordered, as described further below.

Review URL Sub-Function

Figure 3C:
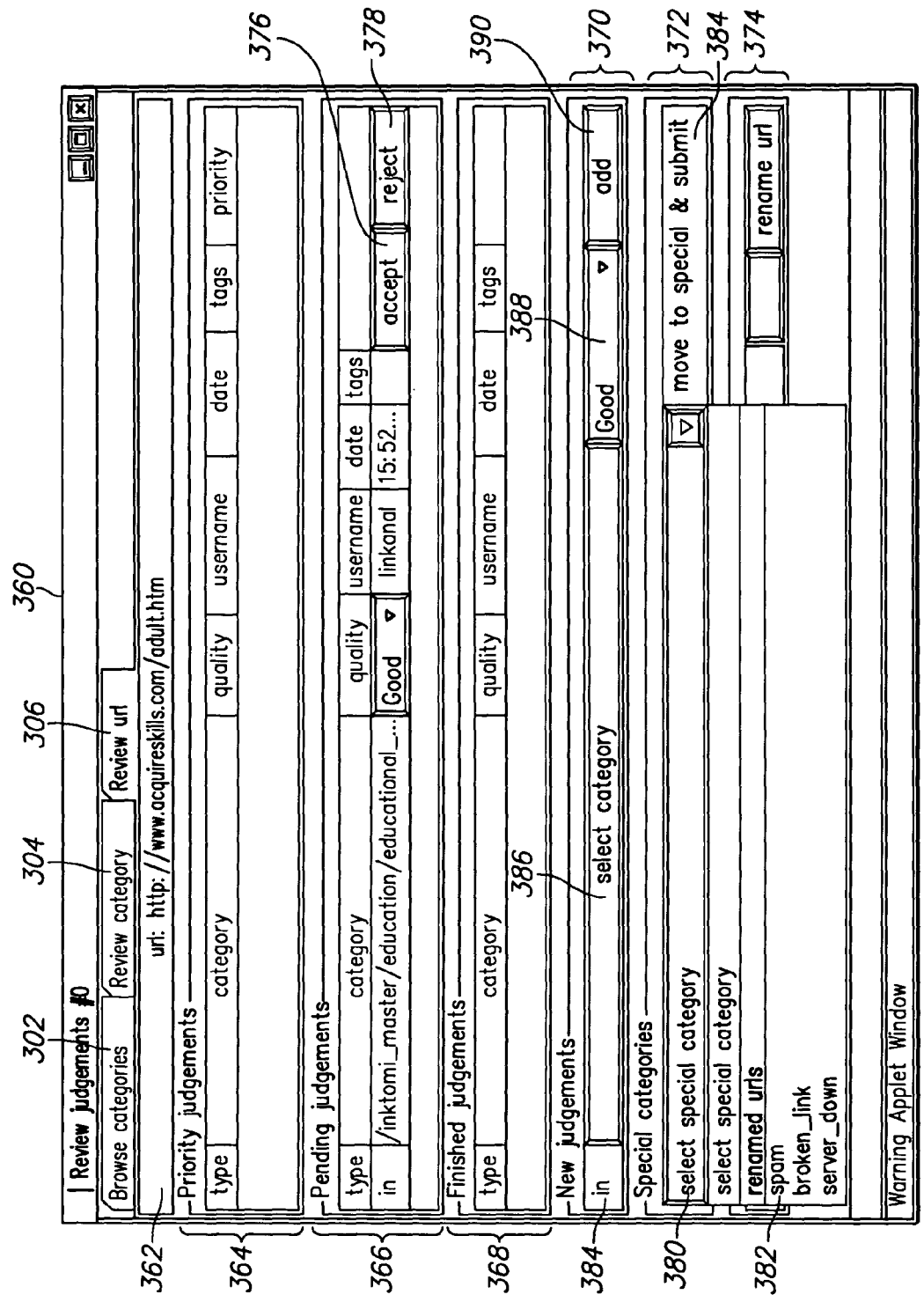
FIG. 3C is a diagram of a display window that may be generated by a directory in connection with a document review function.

FIG. 3C is a diagram of a display window 360 that may be displayed by directory application 124 in connection with Review URL function 216. Generally, window 360 comprises a document name field 362, Priority Judgments pane 364, Pending Judgments pane 366, Finished Judgments pane 368, New Judgments pane 370, Special Categories pane 372, and Rename URL pane 374.

Document name field 362 displays the name or identifier of one electronic document for which judgments are to be reviewed, modified, or created (the "current document").

If there are judgments stored in the master directory 122 for the current document, information describing such judgments is displayed in the Priority Judgments pane 364. For each judgment, the information includes: type (IN, NOT_IN, LOCK_OUT, NEGATE_LOCK_OUT); category that the current document is in, not in, or locked out of; quality of the judgment (e.g., Perfect, Excellent, Good, Fair, Poor); username of the user who entered the judgment; date and time at which the judgment was entered; one or more tag values; and priority level. The tag values may be used to store information about the origin of a judgment, or identify a judgment as belonging to a particular sub-type. For example, tag values may include "P" (indicating that the judgment is not yet reviewed or "pending"), or "S" (indicating that the judgment originated through a split mapping). Since the Priority Judgment information is obtained from the master directory, the user is permitted to review it but there are no modification functions provided.

The Pending Judgments pane 366 displays information about zero or more unapproved judgments that relate to the current document. Preferably, the information includes: type (IN, NOT_IN, LOCK_OUT, NEGATE_LOCK_OUT); category that the current document is in, not in, or locked out of; quality of the judgment (e.g., Perfect, Excellent, Good, Fair, Poor); username of the user who entered the judgment; date and time at which the judgment was entered; and one or more tag values. The user may modify information for a pending judgment at any time.

An Accept button 376 and a Reject button 378 are also displayed in association with each line of pending judgment information. The user may approve and accept the associated judgment information by selecting the Accept button 376. In response, directory application 124 marks the judgment information as accepted or finished, and re-displays the judgment information in the Finished Judgments pane 368.

Figure 3D:
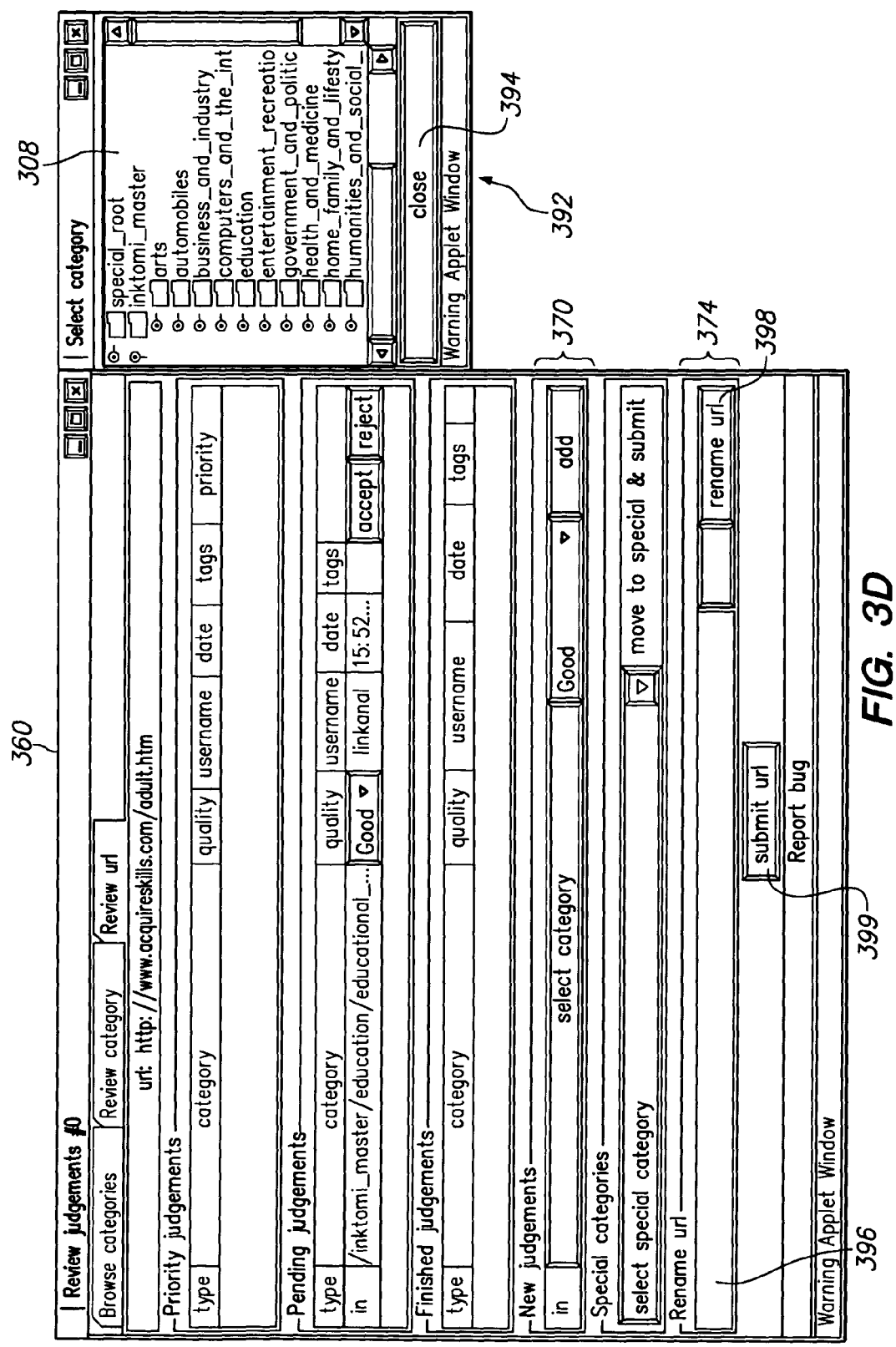
FIG. 3D is a diagram of a window showing an example of a category display that may be generated by a directory.

The judgment information is stored in memory of administrative client 116. To persistently store the judgment information, the Submit URL button 399 of FIG. 3D is activated. In response, directory application 124 transfers the judgment information to directory server 120 and stores the judgment information in custom directory 126. Details of an embodiment of a specific data representation are described below.

The user may also reject the judgment information by selecting the Reject button 378. In response, directory application 124 changes the current judgment type value to NOT_IN, and temporarily stores the modified judgment in memory. If the user subsequently activates the Submit URL button 399, then at directory server 120, directory application 124 removes, from custom directory 126, any previous IN judgment for the current document and the current category and having a priority value that is equal to or lower than the priority value of the NOT_IN judgment. At directory server 120, directory application 124 broadcasts the change to all clients that are working on the current taxonomy. Thus, a REJECT operation will override any lower priority mapping that indicates that the current URL is IN the current category.

A document may be moved to one of the special categories (renamed_urls, spam, broken_link, server_down) using tools provided in the Special Categories pane 372. The user selects one of the special categories by selecting the Select Special Category title bar 380 and choosing one of the categories from an associated pull-down menu 382. After selecting the special category, the user selects the Move To Special & Submit button 384. In response, directory application 124 stores information about the current document, including any judgment information, in the special category and removes the same information from any regular categories the document was in.

The New Judgments pane 370 may be used to enter a new judgment in the custom directory 126 for the current document. The user selects a judgment type from pull-down menu 384. The user indicates which category the current document is IN by selecting a category button 386. In response, directory application 124 provides a display of categories in the current custom directory.

FIG. 3D is a diagram of window 360 showing an example of a category window 392 that may be generated by directory application 124 in response to selection of the category button 386. Category window 392 displays the current taxonomy 308 in the same general form as shown in FIG. 3A. A user may select a category for the new judgment that is being defined by selecting the name of the category in window 392. In one embodiment, placing a mouse cursor on a category in window 392 and double-clicking a mouse button causes the selected category to appear in the New Judgments pane 370, and closes window 392. Alternatively, window 392 may be closed manually by selecting Close button 394.

Referring again to FIG. 3D, Rename URL pane 374 includes a URL name field 396 and a Rename URL button 398. To rename the current electronic document, the user enters the new name in the URL name field 396, and selects the Rename URL button 398. In response, directory application 124 stores a copy of the current judgment information, and information about the associated electronic document, in the renamed_urls category of the special_root node of the custom directory 126.

In the preferred embodiment, the foregoing functions cause judgment information to be stored temporarily in the custom directory 126 or in other temporary storage areas in memory or in non-volatile storage. To store the information persistently, the Submit URL button 399 is selected. In response, directory application 124 stores the updated judgment information shown in window 360 in the custom directory 126.

Processing Mappings

A mapping of the taxonomy of the master directory 122 to the taxonomy of the custom directory 126 is stored in the form of a file containing one or more sequential records. Each record stores: information identifying who created the record; information identifying when the record was made; an identifier of the source node; and an identifier of the destination node. The information identifying who created the record may comprise a user name. Other identifying information, such as an Internet Protocol (IP) address or account information associated with the server that hosts the customized directory, or the equivalent, could be used. The information identifying when the record was made may comprise a time stamp or the equivalent. The source node identifier indicates one of the nodes of the master directory. The destination node identifier indicates one of the nodes of the customized directory. Further information on data representation of mappings is given below in the section entitled "Data Representation."

A mapping of the master directory to the customized directory may reflect any change with respect to the master directory that is useful or desirable to the owner or operator of the customized directory. For example, the owner or operator of the customized directory can change the taxonomy of the master directory by renaming a node, moving a node to a different hierarchical location, adding one or more new nodes, or deleting one or more nodes. A mapping may reference any node of the master directory and any node in the customized directory or taxonomy.

A mapping may comprise a split, a one-to-one mapping, or a merge. A split occurs when one source category is mapped to multiple destination categories. A one-to-one mapping occurs when one source category has exactly one destination category, and the converse is also true. A merge occurs when multiple source categories are mapped to a single destination category. Combinations of these mappings may occur.

Figure 2B:
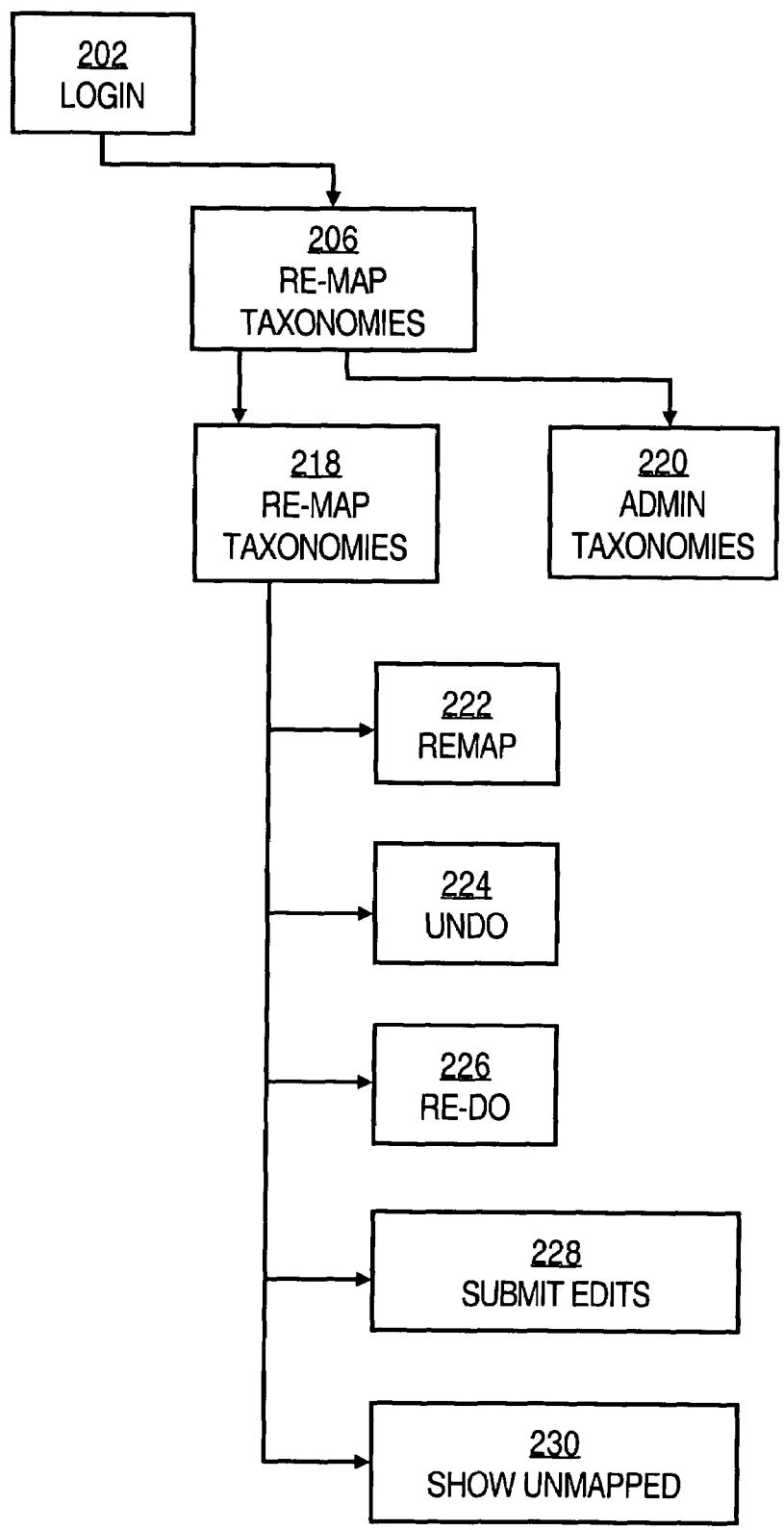
FIG. 2B is a block diagram of taxonomy mapping functions that may be provided by a directory.
Figure 2C:
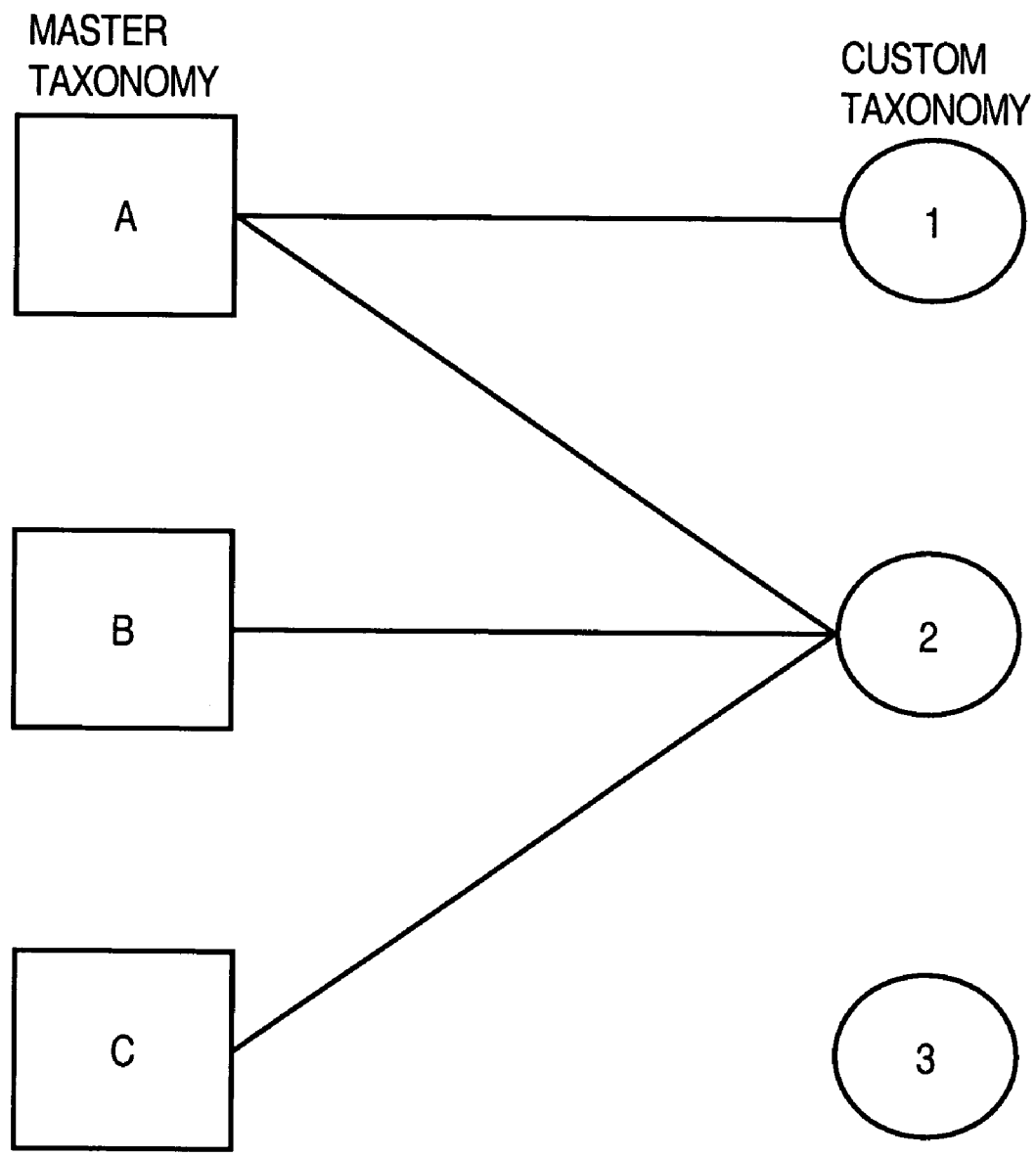
FIG. 2C is a block diagram of exemplary mappings of categories of taxonomies.

FIG. 2C is an example of a combination of mappings involving source taxonomy categories A, B, and C and destination taxonomy categories 1, 2, and 3. Category A is involved in a split between destination category 1 and destination category 2. Category A is also involved in a merge between categories A, B and C directed to destination category 2. Category B is involved in the merge between categories A, B and C directed to destination category 2. Category C is also involved in the merge between categories A, B and C directed to destination category 2. Destination category 3 has no corresponding source category. Therefore: category 1 will contain the electronic documents that are found in master directory category A; category 2 will contain all electronic documents that are found in master directory categories A, B, and C; category 3 will contain the same population of electronic documents as the master directory.

Directory mapping enables a user to customize the master directory by adding nodes, deleting nodes, renaming nodes, and moving nodes around. These operations may enable the user to improve the quality of the master directory.

FIG. 2B is a block diagram of functions available when the Re-Map Taxonomies function 206 is selected. Generally, there may be two sub-functions. An Administration of Taxonomies sub-function 220 enables the user to carry out administrative functions relating to directory application 124, such as setting permissions relating to creation and modification of taxonomy mappings. In one embodiment, a Re-Map Taxonomies sub-function 218 provides a way for a user to select one of several custom directories or taxonomies and then carry out work on the selected directory or taxonomy. When the Re-Map Taxonomies function is selected, in response, directory application 124 displays a pull-down menu that lists one or more mappings that have been previously created. The user selects one of the custom mappings. In response, directory application 124 displays a window containing tools for working with that mapping.

Names of the mappings that are displayed in the pull-down menu are obtained from a file stored at directory server 120. Each mapping has a unique identifier. In one embodiment, directory application 124 at administrative client 116 asks directory server 120 what to put in the pull-down menu. Directory server 120 reads a file that contains a list of valid mappings. One or more permission values are stored in the list in association with the names of mappings. Directory application 124 displays only those mappings that the current user has permission to read, read/write, or administer.

To create a new mapping, an administrative user may create a new, empty mapping log file; create or obtain a source taxonomy; add the name of the source taxonomy to a taxonomy info file; and add the name of the new mapping to a mapping info file. Details of the formats of these and other files are described further below.

Figure 4A:
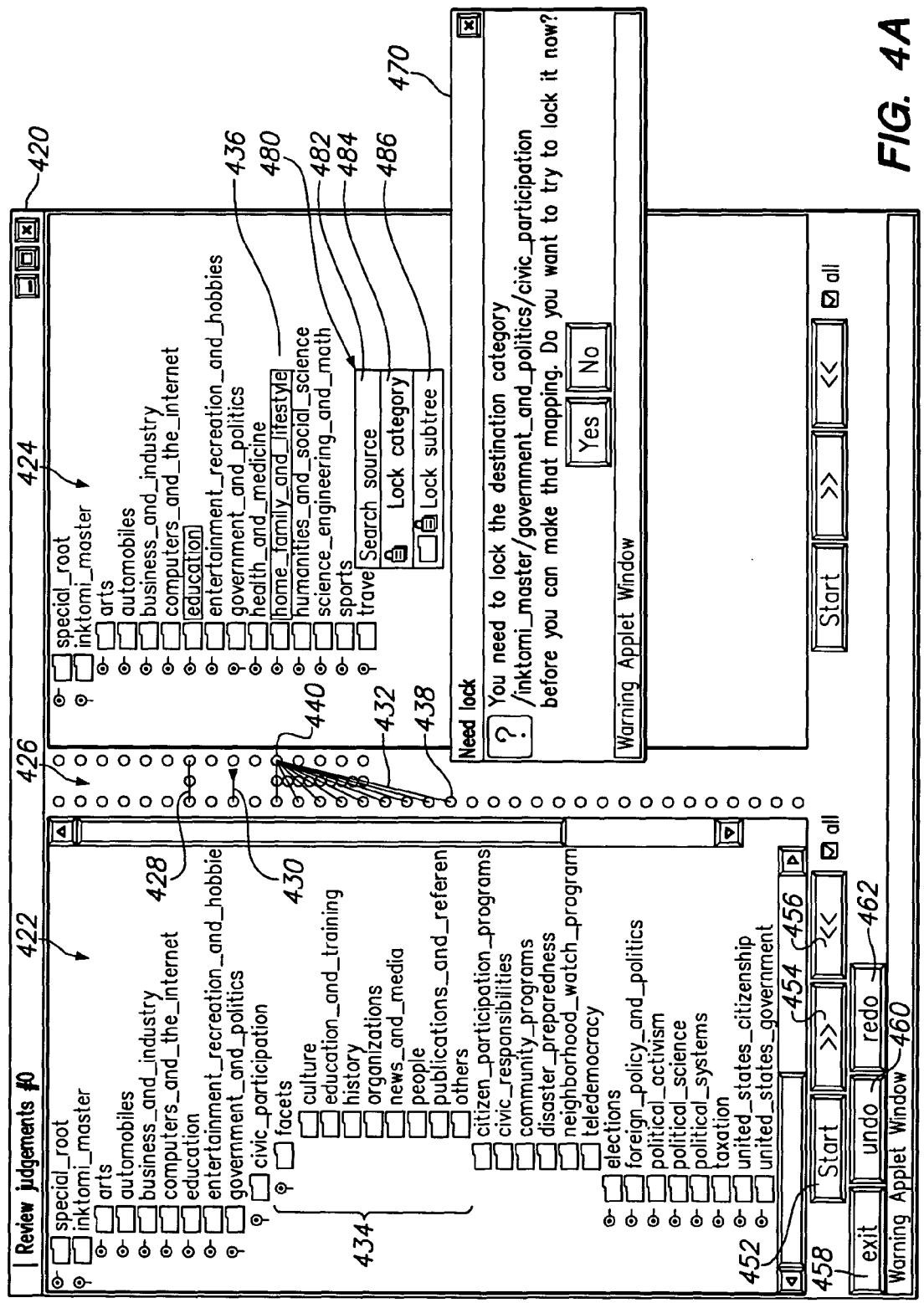
FIG. 4A is a diagram of a display window that may be generated by a directory in response to selection of a custom taxonomy for editing or re-mapping.

FIG. 4A is a diagram of a display window 420 that may be generated by directory application 124 in response to selection of a custom taxonomy. Window 420 includes tools, buttons, and functions that implement further sub-functions that may include Re-Map sub-function 222, Undo sub-function 224, Re-Do sub-function 226, Submit Edits sub-function 228, and Show Unmapped sub-function 230.

Re-Map sub-function 222 is carried out by graphically creating mappings using window 420. Master taxonomy pane 422 of window 420 displays the taxonomy of master directory 122. Custom taxonomy pane 424 displays the taxonomy of custom directory 126. Mappings are graphically created and indicated in mapping area 426. Each mapping is graphically represented by a line extending from a terminal icon associated with a category of the master directory to a terminal icon associated with a category of the custom directory. For example, FIG. 4A shows a first mapping 428 that expresses a one-to-one mapping of the "education" category of the master directory to the "education" category of the custom directory.

When the source category or the destination category of a mapping is displayed in collapsed form within one of the taxonomy panes 422, 424, a hidden mapping icon indicates that a portion of the mapping is hidden in the current display. For example, in FIG. 4A, a second mapping 430 expresses either a one-to-one mapping or a split mapping of the category "government and politics" of the master directory to one or more child nodes or sub-categories of the "government and politics" category of the custom directory. The exact mapping cannot be determined visually from the display of FIG. 4A because the "government and politics" category of the custom directory is collapsed.

A mapping may express a merge or a split. For example, a third mapping 432 expresses a merge of a plurality of categories 434 of the master directory to the "home_family_and_lifestyles" category of the custom directory. A plurality of source terminal nodes 438 and associated lines are directed from the master taxonomy and converge at a single destination terminal node 440 of the custom taxonomy.

When a taxonomy becomes large, it may be difficult for a user to locate a particular source category in the master directory to set up a new mapping. In addition, in one embodiment, directory application 124 may be configured to support multiple simultaneous users or administrative clients 116. Accordingly, category searching and locking functions may be provided. In the preferred embodiment, a user may access the category searching and locking functions by selecting a category in the custom taxonomy and pressing a mouse button. In response, directory application 124 displays a special function menu 480 over window 420.

Menu 480 includes a Search Source option 482, Lock Category option 484, and Lock Subtree option 486. Selecting Search Source option 482 causes directory application 124 to search the taxonomy of the master directory to identify a category that matches the current category of the custom directory. If a matching category is found, that category and surrounding categories are displayed in pane 422. The user may then create a mapping by dragging a link from the source terminal icon associated with the matching category to a desired destination terminal node of a category in the custom taxonomy.

The Lock Category option 484 sets a lock on the current selected category so that no other user can modify its mappings. The Lock Subtree option 486 sets a lock on the current selected category, and all its child categories.

In an alternate embodiment, menu 480 also includes a New Peer option and a New Child option. When the New Peer option is selected, directory application 124 inserts a new category at the same level of the taxonomy as the current category, and prompts the user to enter a name for the new peer category. When the New Child option is selected, directory application 124 inserts a new category one level below the current category, and prompts the user to enter its name.

When a new mapping is created, directory application 124 requires the user to lock the destination category in the custom taxonomy. If a mapping is attempted without initially setting a lock, directory application 124 displays a lock warning dialog box 470 over window 420. In the example of FIG. 4A, the user is creating the second mapping 430, which terminates at the category "government_and_politics/civic_participation"; however, that category is not locked. Accordingly, dialog box 470 prompts the user to set a lock. If no lock is set, the user cannot create a new mapping.

Color may be used to assist the user in creating valid mappings. In the preferred embodiment, each terminal icon may have no color or may be colored yellow, green, red, or blue. A terminal icon with no color has no mapping associated with it. When a new mapping is created, a destination terminal icon changes to red while the user is hovering the mouse cursor over that icon, if the user is not permitted to make a mapping terminating at that icon. For example, attempting to create a mapping from one category of a directory to another category of the same directory causes the second terminal icon to change to red, and a mapping cannot be created. If the user is permitted to make a mapping terminating at a particular icon, then that icon turns yellow when the mouse cursor hovers over it. A green terminal icon indicates that a valid one-to-one mapping terminates at that icon. A blue terminal icon indicates that a valid mapping terminates at that icon and that the icon is part of a multiple mapping such as a split or merge.

Automatic merge mappings may be created. In an embodiment, an automatic merge mapping may be created by selecting a category of the master directory that has child categories, pressing a control key of the keyboard, or the equivalent, and moving the mouse cursor to a category of the custom directory. When the mouse is released, in response, directory application 124 maps all the child categories of the master directory category to the selected category of the custom directory, creates and stores associated mapping information, and displays graphical lines that indicate the multiple mapping.

Window 420 also includes a Start button 452, Forward button 454, and Reverse button 456 associated with each pane 422, 424. A user may select the first category of a taxonomy by pressing the Start button 452 associated with the pane 422, 424 in which the taxonomy is displayed. The user may advance to the next category by selecting the Forward button 454 and may move to the preceding category using the Reverse button 456. Thus, using these buttons, a user may select a first category and then step through each successive category in a rapid, orderly manner.

This facilitates creating or reviewing a mapping of a complete taxonomy and ensures that no child category is overlooked in the process.

Window 420 further includes an Exit button 458, Undo button 460, and Redo button 462. A user may discontinue working with a mapping by selecting the Exit button 458. In response, directory application 124 returns control to Re-Map Taxonomies function 206. A user may remove the most recently created mapping by selecting the Undo button 460. In response, directory application 124 deletes the most recently stored mapping record from the mapping log file. The user may restore the most recently deleted mapping 462 by selecting the Redo button 462.

The Undo and Redo operations are supported by information and structures in memory at the administrative client 116 that comprise a log of operations carried out by the user. When information is submitted to directory server 120 using the Submit URL button 399, the client cannot Undo or Redo the changes that are submitted.

Modifying the Master Directory

In one embodiment, the owner or operator of the master directory may also modify the master directory to create a new master directory, and create a mapping between the old master directory and the new master directory that reflects the modifications. The customized directory, which is based on a mapping to the old master directory, still can be updated. Thus, subsequent modifications or updates to the master directory may be automatically integrated into the custom directory.

When the master directory is modified, the owner or operator of the master directory carries out the modification by creating one or more mappings of a first version of the master directory to a second version of the master directory. The second version is the modified master directory. To propagate such modifications to the custom directory, the mapping of the first version of the master directory to the custom directory is modified to express it in terms of the second version of the master directory.

Data Representation

Figure 4B:
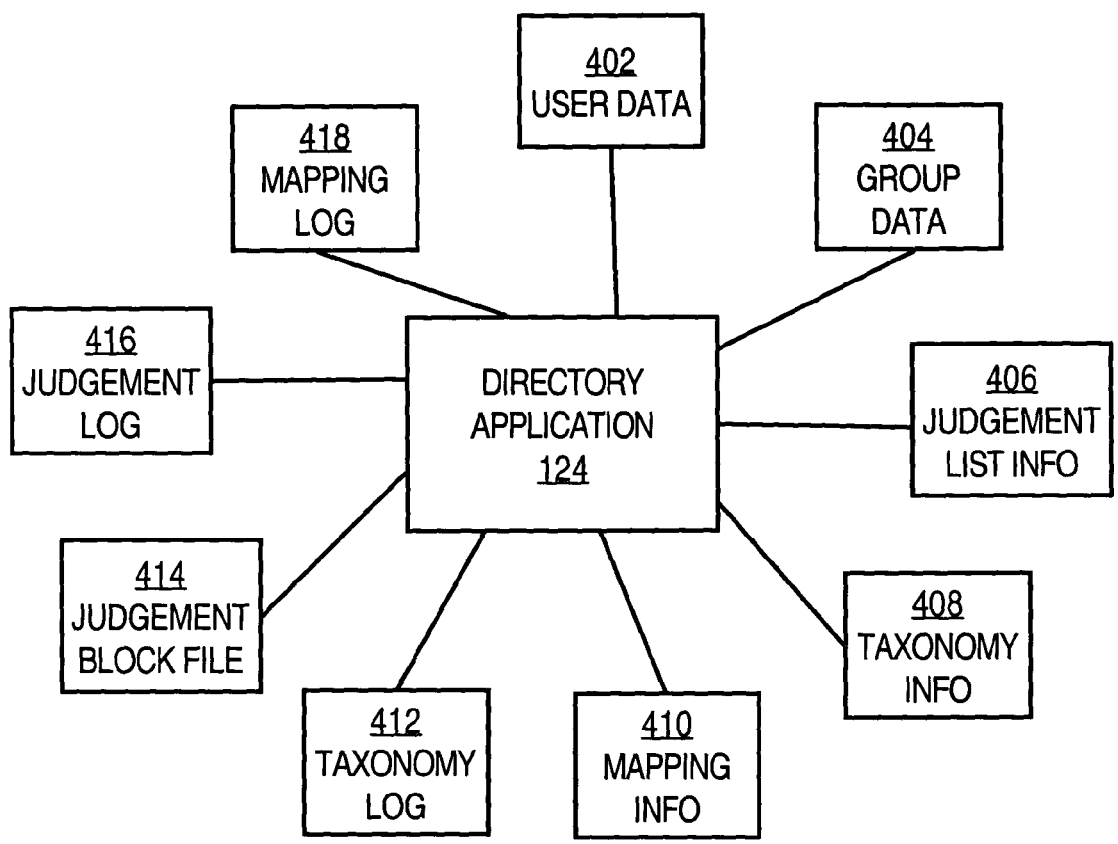
FIG. 4B is a block diagram of data representation elements that may be used in an embodiment.

FIG. 4B is a block diagram of data representation elements that may be used in an embodiment. Generally, directory application 124 may interact with user data 402, group data 404, judgment list information 406, taxonomy information 408, mapping information 410, taxonomy log 412, judgment block file 414, judgment log 416, and mapping log 418.

For convenience, the terms "log," "file," and similar terms may be used to identify the foregoing elements. However, any form of data representation may be used to store the information that is described in connection with these elements. Use of files is not required. Linked lists, stacks, database tables, and other forms of data storage may be used.

User data 402 stores and specifies information about usernames that directory application 124 will recognize as valid during login function 202. The information in User data 402 is reread every time a new user authentication is attempted. Each record in user data 402 comprises a username, password, and priority value. Preferably, usernames and passwords are case-sensitive. The priority value, which may be an integer value, is used in the Review URL sub-function. The category number value is ignored for LOCK_OUT and NEGATE_LOCK_OUT entries. The following rules are observed with respect to priority of judgments:

1. Judgments of lower priority cannot affect earlier judgments of higher priority.
2. IN judgments override previous IN and NOT_IN judgments.
3. NOT_IN judgments override previous IN and NOT_IN judgments.
4. LOCK_OUT judgments override previous IN judgments.
5. NEGATE_LOCK_OUT judgments override previous LOCK_OUT judgments. However, the IN judgments that the previous LOCK_OUT judgment overrode are still overridden.

Group data 404 stores and specifies information about groups for the system. Group names are case-sensitive, and may comprise alphanumeric characters. Group data 404 is reread every time a new user authentication is attempted.

Preferably, group data 404 stores information in the following format: <groupname><# admin groups><admin groupname> . . . <# admin users><admin username> . . . <# member groups><member groupname> . . . <# member users><member username> . . .

Judgment list info 406 specifies what judgment lists are available. Every judgment list is specified by a block file, which has only IN judgments in a more compact format, and a judgment list. Every judgment list has an associated taxonomy and a description string. The judgment list must have a unique integer tag.

Preferably, judgment list info 406 stores information in the following format: <<jl num><assoc tax num><block filename><judgment log filename><text description><# admin groups><groupname> . . . <# admin users><username> . . . <#read-write groups><groupname> . . . <# read-write users><username> . . . <#read-only groups>

<groupname> . . . <# read-only users><username> . . .

Every judgment list number must be unique. The block files are opened in read only mode, but the judgment logs are read and then appended to. Two judgment lists could have the same block file. Two judgment lists may not have the same judgment log files, or they will both be appended to simultaneously, which is undesirable.

Taxonomy info 408 specifies what taxonomies are available. Every taxonomy is specified by a taxonomy log 412, and has a unique integer number. A Based On value identifies the taxonomy number of another taxonomy from which the current taxonomy was originally copied. The Based On value may be used when small modifications are made to pre-existing taxonomies, and it is desired to save a trail back to the original taxonomies. A flag value such as "-1" may indicate that a taxonomy is not based on another one.

Preferably, taxonomy info 408 is stored in the following format: <taxonomy number><taxonomy log filename><based on number><writable flag><string description><# admin groups><groupname> . . . <# admin users><username> . . . <#read-write groups><groupname> . . . <# read-write users><username> . . . <#read-only groups><groupname> . . . <# read-only users><username> . . .

Every taxonomy number must be unique. Multiple taxonomies can be based on the same taxonomy. Taxonomies can be opened in both read-only mode and read-write mode. More than one taxonomy may not use the same taxonomy log. The taxonomy log will never be opened for writing if the writable flag is set.

Mapping info 410 stores information identifying existing mappings. A mapping is made between two taxonomies, both of which must be identified in the taxonomy info 408. Preferably, mapping info 410 stores information in the following format:

<source taxonomy number><destination taxonomy number><mapping log file><string description><Boolean lock sources><# admin groups><groupname> . . . <# admin users><username> . . . <#read-write groups><groupname> . . . <# read-write users><username> . . . <#read-only groups><groupname> . . . <# read-only users><username> . . .

The source taxonomy log is opened in read-only mode, and the destination taxonomy log is opened in read-write mode. The mapping log is opened in read-write mode. The Boolean value identifies whether source or destination categories need to be locked to submit new mappings.

A taxonomy log 412 stores information that defines and specifies a taxonomy. Preferably, taxonomy log 412 comprises a plurality of taxonomy log records or lines, each having the format: <identifier number><category number><parent number><category name><type><user><date><index><number of tags><tag> . . .

Each entry in the taxonomy log specifies an action to the taxonomy. The valid values for the <type> field are "0", "1", and "2", which respectively identify CREATE, REMOVE, and MODIFY actions.

Each identifier number is unique; every line in a taxonomy log has a different identifier number. Each category number is unique and not reused; preferably, category numbers are positive integers. For every category number, there must either be no lines in a taxonomy log, or first a CREATE record, then zero or more MODIFY records, then one or zero REMOVE records. It is an error to CREATE the same category number twice, or to MODIFY or REMOVE it before it is CREATEd, or to MODIFY a category number before it is CREATEd or after it is REMOVEd.

For REMOVE records, only the category number is used to identify the category to be removed. The name or index need not match the previous item(s).

For any record, the parent number must be a valid category number, that is, a number of a category that has been CREATE'd and not REMOVE'd. Root level categories use a category number of −1. The username need not be a valid username according to the user data file. The date is stored in the format YYYYMMDDhhmm where YYYY is a year value, MM is a month value, DD is a day value, hh is an hour value, and mm is a minute value.

The index field specifies into which child of a parent a category should be inserted. For example, in the line:

9 40 28 "new child" 0 ssuchter 199903261358 2 2 "hello world" xyz

The new category number is "40," the parent number is "28." Category number "28" must already exist. The new category "40" will have a name of "new child" (without the quotes) and two string tags of "hello world" and xyz. The index field is set to "2." Category number "28" must have at least two children already. If category number "28" has exactly two children, category number "40" will be the third child of category number "28." If category number "28" has more than two children, category number "40" will be inserted into the child list of category number "28" as the third child.

For MODIFY records, the index specifies the new position of the MODIFIED category after it has been removed from the old parent category.

Judgment block file 414 provides a compact way to store and specify many IN judgments. An IN judgment is a judgment that specifies that a URL is within or "in" a specific category. A block file stores one or more chunks of IN judgments that have like attributes. Each chunk is stored in the format:

<number of urls><quality value><top 10 number value><confidence value><weight value>
    <priority value><username><date><pending flag><number of tags value><tag> . . .
    <url><cat num> . . .
    <url><cat num> . . .
    . . .

Any number of such chunks can be stored in the judgment block file 414. If a particular mapping of a URL to a category number exists twice, then the later attributes are used.

The weight and confidence values provide feedback for use in training, or may serve as inputs to an automatic document classifier. The confidence value defines how sure a user is that a judgment quality value is correct. Typically, a confidence value would be entered by a manager of the user who created the associated quality value. For example, if a user enters a series of judgments with quality values, and a manager later determines that the user is incompetent, the manager may assign a low confidence value to the judgments. When the information is read later by an automatic document classifier and used to carry out automatic classification of electronic documents, the classifier will rely less on judgments with low confidence values. The weight value how important the current document is to the training process. For example, a document may be highly relevant to a particular category, but may have little use in training due to unusual internal links or other factors. The weight value for such a document would be low.

The weight value and the confidence value may be stored in the form of floating point numbers. In an alternate embodiment, the weight value and the confidence value could be generated automatically by the classifier.

If a category number is invalid, then a judgment is not made. A category number is invalid if it is not a valid category number for the taxonomy with which the current judgment list is associated.

Judgment log file 416 stores judgment information. In the preferred embodiment, as each judgment is created, a new judgment entry is appended to the judgment log file 416. The valid types of judgments are IN, NOT_IN, LOCK_OUT, and NEGATE_LOCK_OUT, which may be represented, respectively, by different integer values.

Preferably, judgment log file stores one or more lines in the following format:

<identifier number><category number><URL><quality><top 10 number><confidence><weight><priority>
    <type><username><date><pending><number of tags><tag> . . .
    . . .

Each identifier number is a unique, positive value.

Mapping log file 418 specifies mappings and consists of lines of the form:

<id><source cnum><dest cnum><type><username><date><# tags><tag> . . .

The id field is a unique non-negative integer that uniquely identifies each line. The source cnum value is a category number in the source taxonomy. Lines that contain invalid source cnum values are ignored. The dest cnum value is a category number in the destination taxonomy. Lines that contain invalid dest cnum values are ignored. The destination taxonomy and the source taxonomy must be two separate taxonomies, although they can have the same data. While in the mapping mode, the destination taxonomy can be editable. (But the changes are saved in the taxonomy log, not the mapping log)

The type value is either "0", "1", or "2". A value of "0" means to create a mapping between the specified categories. A value of "1" means to remove an existing mapping, and "2" means to modify an existing mapping by changing the username, date, or tags. For every pair of category number values, it is an error to have anything but a type 0 record first. If another type 0 record occurs before a type 1 record, for those categories, that is also an error. After a type 1 record occurs for a particular pair, a type 0 record can occur again, re-creating the mapping. Type 2 records can only appear after type 0 records, but before type 2 records.

The username field is the name of the user that created, modified, or removed the mapping. One user can create a mapping and another user can remove it. The username field is a string that generally is a valid username.

The date field is of the form YYYYMMDDhhmm. The date field is used to enable a user to track how or when mappings are created. The tag values are string values that may store any useful information. Any number of tag values may be used.

Ordering Documents and Integrating Order Modifications

Referring again to FIG. 3B, an order value is stored in association with the information that identifies a document. Documents are displayed in list 334 according to the order values in ascending order. Documents in list 334 may be re-ordered by selecting an identifier of a document, such as its URL, and dragging it into a new location in the list. In response, directory application 124 locks the current category and modifies the order value to reflect the new order.

The order value is associated exclusively with the custom directory. If the master directory is modified such that a particular document is moved to a new ordinal location in a corresponding category, the new order value of that document in the master directory is not transferred to the document in the custom directory. Generally, the order value of the document in the custom directory always takes precedence. Documents that do not have an order value specified in the custom directory, but do have an order value specified in the master directory, are processed specially. Such documents are placed, in the custom directory, lower in order than documents in the custom directory that have an order value, but higher in order than un-ordered documents of the custom directory.

In an embodiment, re-ordering may be carried out as in several different cases.

To calculate the order of judgments within a category, the directory application 124 may sort the IN judgments for a particular category first according to their order number, with higher orders first, then by their quality, with higher quality first, and then by their document identifier or URL, in alphabetic order with earlier URLs first.

When a user is re-ordering documents using directory application 124 at one of the clients, which may be done using the Review Category sub-function 214, the following process is carried out to integrate the re-ordered documents.

1. The user reorders some documents in a category and clicks on a "Submit Reorder" button.

2. Directory application 124 calculates N, where N is the number of documents starting at the top of the category which are out of order by their quality or document identifier value. The order number value is not considered for this step.

3. Directory application 124 assigns the value "0" to the order fields of all documents after point N.

4. Directory application 124 starts at the Nth document and assigns it an order number of "1". The value "1" is also assigned to a Current Order value. The directory application 124 works upwards through the list, assigning the Current Order value to every document, and incrementing the Current Order value every time a document and the document preceding it are out of order according to their quality or document identifier value. In the worst case, the Current Order value is incremented once for every document and the top document is assigned an order value of N.

When directory application 124 is mapping judgments from a master directory to a custom directory, the following process is used.

1. For every custom directory category, calculate the list of all of the judgments which are placed in that directory category.

2. Calculate the maximum value of the order field for all those judgments. Subtract the maximum value+1 from every order field, so that the highest order number from a mapped judgment is "−1".

3. Accordingly, when these judgments are considered in conjunction with the custom judgments, all of the custom judgments' order numbers will be higher than the mapped judgments, so they will be placed on top.

Automatically Populating a Custom Directory

After the mappings are created and stored, the master directory may use the mappings to automatically add electronic documents ("populate") to categories of the customized directory. Generally, a process of automatically populating a custom directory is carried out based on the mappings of the master directory to the custom directory. The mappings may be used to transfer identifiers of electronic documents from nodes of the master directory to nodes in the custom directory. In this manner, a custom directory is created that has a different look and feel than the master directory.

In one embodiment, a populating mechanism periodically reads the stored mapping information and judgment information, and creates and stores the custom directory based on it. Thus, populating the custom directory is carried out in an offline or batch mode. Alternatively, the populating mechanism may be integrated into directory application 124, and the populating operation may be carried out in real time as a user creates or modifies mappings.

Figure 5:
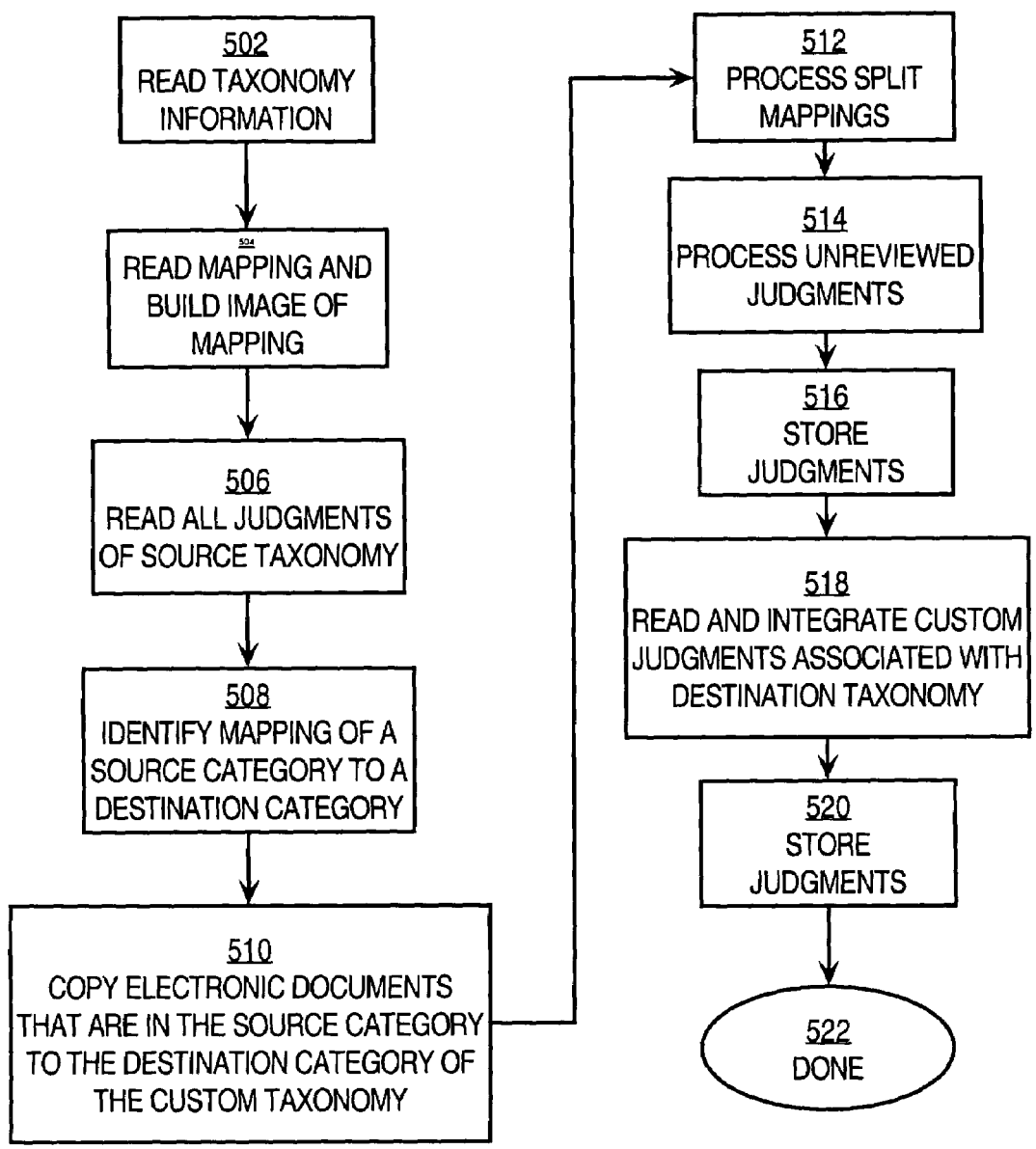
FIG. 5 is a flow diagram of an embodiment of a method of populating a custom directory.

FIG. 5 is a flow diagram of an embodiment of a process of populating a custom directory. A populating mechanism may populate a custom directory by carrying out the steps of FIG. 5.

In block 502, the process reads taxonomy information. In one embodiment, the populating mechanism sequentially reads each taxonomy record from the taxonomy file into memory. The populating mechanism builds a list of valid category numbers based on the taxonomy file records. This enables the mechanism to determine what category numbers are valid.

In block 504, the process reads the mapping of a source directory or taxonomy to a destination directory or taxonomy, and builds an image of the mapping. For example, the mapping log file is read and one or more objects or other data structures are created and stored in memory, thereby building a memory image of the mapping between the taxonomies. This may involve identifying the source node in the current mapping record, locating the corresponding node in the source directory, and locating its list of subordinate categories and its list of electronic documents (one or both of which may have a null value).

In block 506, all the judgments of the source taxonomy are read. In one embodiment, the populating mechanism reads all the judgments for the source taxonomy into memory from the judgment block file associated with the source directory, which is normally the master directory. If this information exceeds available memory, known memory management techniques may be used to keep needed information available in memory.

A mapping of a source category to a destination category is identified, as shown in block 508. For example, for each category of the source taxonomy, the populating mechanism determines the destination category to which the source category is mapped. A mapping involving a category having one or more child categories is not automatically propagated to the child categories.

In block 510, electronic documents that are in the current source category are copied to the destination category of the custom taxonomy. In one embodiment, the populating mechanism then copies each IN judgment for the source category into the destination category of the custom directory, in memory. Generally, all values of a source judgment are carried over into the custom directory, including priority values, etc.

Merge mappings are processed. Preferably, a Merge mapping is handled like a plurality of one-to-one mappings.

Split mappings are also processed, as shown by block 512. For example, if a Split mapping is encountered, the populating mechanism marks each destination judgment with an "S" tag by storing the value "S" in one of the tag fields. This informs the user that the judgment in the custom directory resulted from a split, to enable the user to review the appropriateness of that judgment.

In block 514, un-reviewed judgments are processed. In one embodiment, if a judgment in a source category is marked "Pending," for example, using a "P" tag value, several different operations can be carried out. In one embodiment, each such judgment is not marked pending in the destination category. Alternatively, the tag value is left unchanged, so that all Pending tags pass through to the destination category.

In another alternative, when a source category is not marked "Pending," and is involved in a Split mapping, the judgment is always marked "Pending" in the destination categories. This indicates to the user that the judgment should be reviewed to ensure the split is appropriate.

When a judgment type value of LOCK_OUT is encountered, in response, the populating mechanism removes the document associated with that judgment from any category that the document is in, except for any such category that contains an IN judgment for the same document having a higher priority value than the priority value of the LOCK_OUT judgment. In client, a complementary IN judgment is concurrently submitted for one of the special categories so that a user can see a trace of what happened in processing the LOCK_OUT judgment.

The judgments that have been added to the destination taxonomy are stored, as shown in block 516. For example, the populating mechanism stores a copy of all the judgments of the destination categories in a judgment block file that is associated with the custom directory. As described above, the judgment block file stores only IN judgments and thus has a more compact format.

In block 518, custom judgments associated with the destination taxonomy are read and integrated with the destination taxonomy. As an example, the populating mechanism reads the judgment log file associated with the custom directory. As described above, the judgment log file stores judgments that have been entered by a user of the custom directory and that represent modifications to the master directory. Each judgment in the custom judgment log file is read and applied to the judgments that are currently stored in memory. This step enables the populating mechanism to override judgments of the master directory with conflicting judgments of the custom directory.

This step may involve testing the priority value associated with each judgment, determining whether it is greater than the priority value of any conflicting judgment from the master directory, and overriding the master directory judgment only when the priority value is greater.

The judgment information may be stored, as shown by block 520. For example, the populating mechanism creates a new judgment block file, stores all the current judgments associated with the custom directory in the new judgment block file, and deletes the old version of the custom directory judgment block file.

Accordingly, the owner or operator of a search engine can customize its directory and still receive and integrate updates from the master directory into the customized directory. The search engine operator can re-map categories of the master directory, and changes to the categories of the master directory are automatically propagated to the customized directory. The operator of the master directory can insert judgments about electronic documents that are indexed in the directory, and its judgments will be entered in the customized directory only when they have less precedence than judgments entered by the owner or operator of the customized directory.

When the custom directory is created, documents associated with each category of the master directory will propagate automatically into the customized directory. Accordingly, separate customized and master directories may be maintained and improved, and the improvements automatically propagate.

When a custom directory is created from each mapping and judgment, the mappings and judgments take precedence over any changes to the master directory.

Advantageously, this system keeps track of who made every mapping and judgment. Thus, the customized directory is dynamic, rather than static. In a static directory, the directory comprises identifiers of electronic documents organized in categories, but there is no stored information that indicates how an electronic document got placed in a category keeps track of how the directory was created, not just its current state.

Hardware Overview

Figure 6:
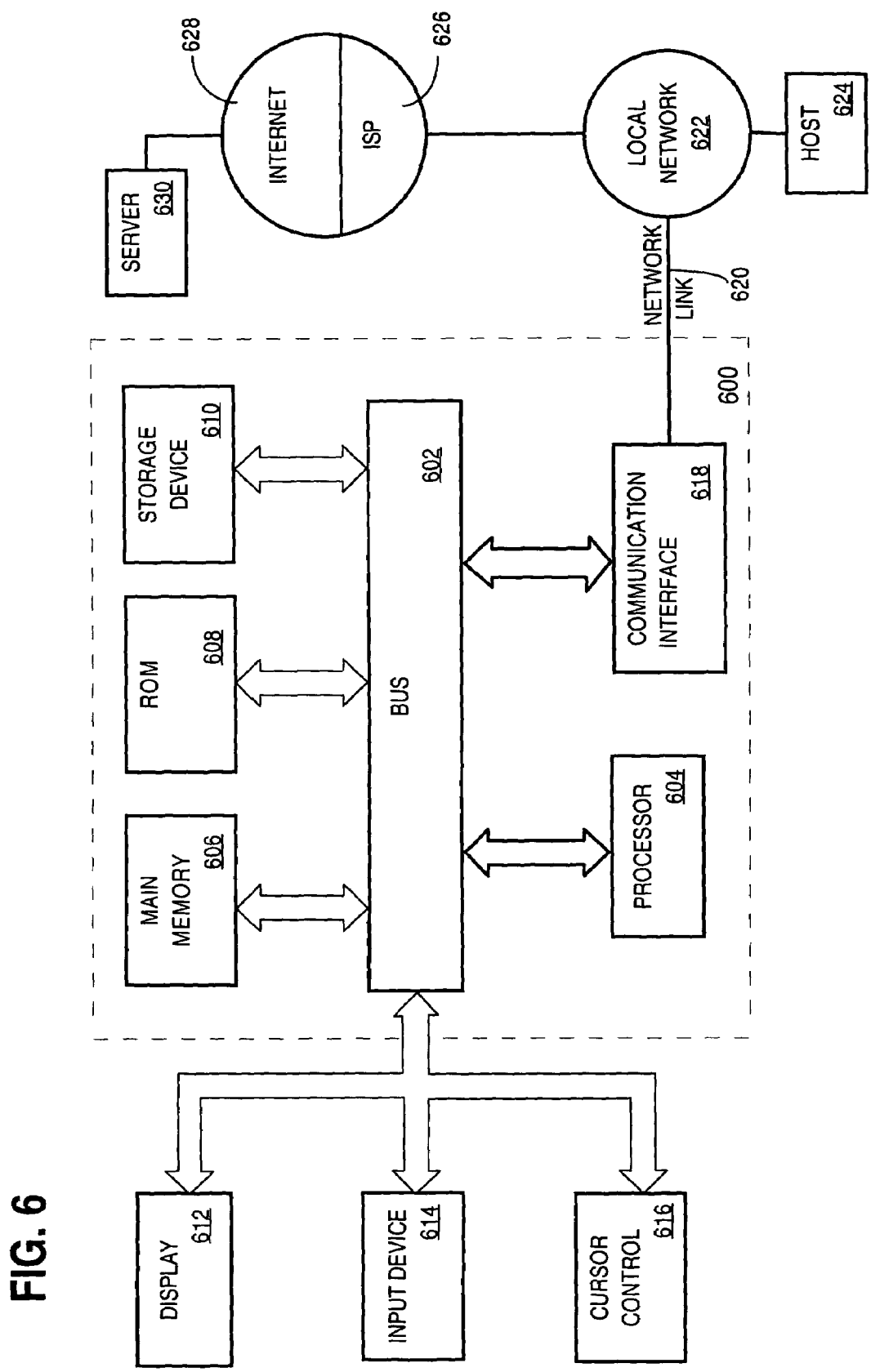
FIG. 6 is a block diagram of a computer system hardware arrangement that may be used to implement aspects of an embodiment.

FIG. 6 is a block diagram that illustrates a computer system 600 upon which an embodiment of the invention may be implemented.

Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing changes to a directory of electronic documents. According to one embodiment of the invention, managing changes to a directory of electronic documents is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing changes to a directory of electronic documents as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable medium carrying one or more sequences of instructions for providing electronic documents, wherein execution of the one or more sequences of instructions by one or more processors causes the one or more processors to perform the steps of:

creating a second directory by mapping the second directory from at least a portion of a first directory of the electronic documents, wherein the first directory has a hierarchy of a first set of one or more categories into which one or more electronic documents are classified, and wherein the second directory has a hierarchy of a second set of one or more categories;

associating, with the second directory, one or more customizations that represent differences between the hierarchy of the first directory and the hierarchy of the second directory; and associating, with the second directory, one or more judgments that indicate whether one or more of the electronic documents are properly classified in the second set of categories;

in response to the first directory being modified by changes to one or more of the first set of categories, automatically modifying the second directory by using at least some of the changes to the one or more categories of the first set of categories, without modifying the customizations or the judgments.

2. The computer-readable medium as recited in claim 1, wherein creating a second directory includes:

identifying or more master judgments that indicate whether one or more of the electronic documents are properly classified in the first set of categories;

in response to the first directory being modified by changes to one or more of the master judgments, automatically propagating the changes to the second directory, without modifying the customizations or the judgments, to create a modified second directory.

3. The computer-readable medium as recited in claim 1, the steps further comprising:

displaying a taxonomy of the second set of categories of the second directory;

receiving a selection of one of the second set of categories;

displaying one or more judgments associated with one of the electronic documents in the selected category; and receiving and storing a quality value that indicates how closely the one of the electronic documents matches the selected category.

4. The computer-readable medium as recited in claim 1, wherein the step of creating a second directory includes the step of creating the second directory based at least partially on one or more customizations that reflect a merge of a plurality of the categories of the first set of categories of the first directory to one of the second set of categories of the second directory.

5. The computer-readable medium as recited in claim 1, wherein the step of creating a second directory includes the step of creating the second directory based at least partially on one or more customizations that reflect a split of one of the first set of categories of the first directory into a plurality of categories of the second set of categories of the second directory.

6. The computer-readable medium as recited in claim 1, the steps further comprising:

creating a new judgment for the second directory, wherein the new judgment indicates that a particular electronic document is in one of the second set of categories of the second directory.

7. The computer-readable medium as recited in claim 1, the steps further comprising:

creating a new judgment for the second directory, wherein the new judgment indicates that a particular electronic document is not in one of the second set of categories of the second directory.

8. The computer-readable medium as recited in claim 1, the steps further comprising:

creating a new judgment for the second directory, wherein the new judgment indicates that a particular electronic document is locked out of all categories of the second directory.

9. The computer-readable medium as recited in claim 6, the steps further comprising:

marking the new judgment as un-reviewed; and receiving an acceptance signal indicating that the new judgment is accepted, and in response thereto, persistently storing the new judgment in the second directory.

10. The computer-readable medium as recited in claim 6, the steps further comprising:

marking the new judgment as un-reviewed; and receiving a rejection signal indicating that the new judgment is rejected, and in response thereto, modifying the new judgment to indicate that the electronic document is not in the category.

11. The computer-readable medium as recited in claim 1, the steps further comprising the step of integrating the customizations and judgments into the second directory by performing the steps of:

identifying each mapping of a source category in the first set of categories of the first directory to a destination category in the second set of categories of the second directory;

using the mapping to copy each judgment that is in the source category to the destination category; and marking as un-reviewed, each judgment that is copied to the destination category and that originates from a split mapping of the source category.

12. The computer-readable medium as recited in claim 11, the steps further comprising:

marking as un-reviewed, each judgment that is copied to the destination category and that originates from an un-reviewed judgment in the source category.

13. The computer-readable medium as recited in claim 11, the steps further comprising:

creating one or more custom judgments that are associated with the second directory; and integrating each of the custom judgments into the second directory by overriding any conflicting judgment originating from the first directory.

14. The computer-readable medium as recited in claim 11, the steps further comprising:

creating one or more custom judgments that are associated with the second directory, wherein the custom judgments have a judgment type value selected from among "in category," "not in category," "exclude from all categories", and "undo exclude from all categories"; and integrating each of the custom judgments into the second directory by overriding any conflicting judgment originating from the first directory.

15. The computer-readable medium as recited in claim 11, the steps further comprising:

creating one or more custom judgments that are associated with the second directory, wherein the custom judgments have a judgment type value selected from among "in category," "not in category," "exclude from all categories", and "undo exclude from all categories"; and integrating each of the custom judgments into the second directory by overriding any conflicting judgment originating from the first directory, wherein the integrating is carried out such that: judgments of lower priority cannot affect earlier judgments of higher priority; "in" judgments override previous "in" and "not in" judgments; "not in" judgments override previous "in" and "not in" judgments; "exclude from all categories" judgments override previous "in" judgments; and "undo exclude from all categories" judgments override previous "exclude from all categories" judgments.

16. A computer-readable medium carrying one or more sequences of instructions for providing electronic documents, wherein execution of the one or more sequences of instructions by one or more processors causes the one or more processors to perform the steps of:
creating a customized directory by mapping at least a portion of a master directory of the electronic documents into at least a portion of the customized directory, wherein the master directory is defined by a hierarchical taxonomy of a first set of categories into which one or more of the electronic documents are classified, and wherein the customized directory has a second set of categories;
associating, with the customized directory, one or more customizations that reflect differences between the master directory and the customized directory;
associating, with the customized directory, one or more judgments that indicate whether one or more of the electronic documents are properly classified in the second set of categories;
in response to the master directory being modified by changes to one or more of the categories, automatically propagating the changes in the master directory to the customized directory, without overriding the customizations or judgments of the customized directory.

17. The computer-readable medium as recited in claim 16, the steps further comprising:
identifying one or more master judgments that represent whether one or more of the electronic documents are properly classified in the first set of categories; and
in response to the master directory being modified by changes to one or more of the master judgments, automatically propagating the changes to the customized directory, without modifying the customizations or the judgments, to create a modified customized directory.

18. The computer-readable medium as recited in claim 16, the steps further comprising creating and storing one or more judgments of the customized directory by performing:
displaying a taxonomy of the second set of categories of the customized directory;
receiving a selection of one of the second set of categories;
displaying one or more judgments associated with one of the electronic documents in the selected category; and
receiving and storing a quality value that indicates how closely the one of the electronic documents matches the selected category.

19. The computer-readable medium as recited in claim 16, wherein the step of creating the customized directory includes the step of creating the customized directory based at least partially on one or more customizations that reflect a merge of a plurality of the first set of categories of the master directory to one of the second set of categories of the customized directory.

20. The computer-readable medium as recited in claim 16, wherein the step of creating the customized directory includes the step of creating the customized directory based at least partially on one or more customizations that reflect a split of one of the first set of categories of the master directory into a plurality of categories in the second set of categories of the customized directory.

21. The computer-readable medium as recited in claim 16, the steps further comprising:
creating a new judgment for the customized directory, wherein the new judgment indicates that a particular electronic document is in one of the second set of categories of the customized directory.

22. The computer-readable medium as recited in claim 16, the steps further comprising:
creating a new judgment for the customized directory, wherein the new judgment indicates that a particular electronic document is not in one of the second set of categories of the customized directory.

23. The computer-readable medium as recited in claim 16, the steps further comprising:
creating a new judgment for the customized directory, wherein the new judgment indicates that a particular electronic document is locked out of all categories of the customized directory.

24. The computer-readable medium as recited in claim 23, the steps further comprising:
marking the new judgment as un-reviewed; and
receiving an acceptance signal indicating that the new judgment is accepted, and in response thereto, persistently storing the new judgment in the customized directory.

25. The computer-readable medium as recited in claim 23, the steps further comprising:
marking the new judgment as un-reviewed; and
receiving a rejection signal indicating that the new judgment is rejected, and in response thereto, modifying the new judgment to indicate that the electronic document is not in the category.

26. The computer-readable medium as recited in claim 16, further comprising the step of integrating the customizations and judgments into the customized directory by performing:
identifying each mapping of a source category in the first set of categories of the master directory to a destination category in the second set of categories of the customized directory;
using the mapping to copy each judgment that is in the source category to the destination category; and
marking as un-reviewed, each judgment that is copied to the destination category and that originates from a split mapping of the source category.

27. The computer-readable medium as recited in claim 26, the steps further comprising:
marking as un-reviewed, each judgment that is copied to the destination category and that originates from an un-reviewed judgment in the source category.

28. The computer-readable medium as recited in claim 27, the steps further comprising:
creating one or more custom judgments that are associated with the customized directory; and
integrating each of the custom judgments into the customized directory by overriding any conflicting judgment originating from the master directory.

29. A computer-readable medium carrying one or more sequences of instructions for re-categorizing documents that have been categorized in a first directory based on a first hierarchy of categories, wherein execution of the one or more sequences of instructions by one or more processors causes the one or more processors to perform the steps of:
associating judgment data with sets of one or more of said documents;
wherein said judgment data represents whether said sets of one or more of said documents are properly classified within a second hierarchy of categories;

generating a second directory based on the first directory;
wherein the second directory categorizes said documents based on the second hierarchy of categories; and
wherein the step of generating said second directory based on said first directory is performed based on:
a mapping between the documents and the categories of the second hierarchy of categories, and
said judgment data.

30. The computer-readable medium of claim 29, the steps further comprising the step of, after generating the second directory, automatically propagating a change to one or more of the categories in the first hierarchy to the second directory.

31. The computer-readable medium of claim 30, wherein propagating a change includes propagating the change without modifying said judgment data.

32. The computer-readable medium of claim 29, wherein associating judgment data with sets of one or more of said documents includes associating a first judgment data that indicates the one or more documents belong to a category in at least one of the first hierarchy and the second hierarchy.

33. The computer-readable medium of claim 29, wherein associating judgment data with sets of one or more of said documents includes associating a first judgment data that indicates the one or more documents do not belong to a category in at least one of the first hierarchy and the second hierarchy.

34. The computer-readable medium of claim 29, wherein associating judgment data with sets of one or more of said documents includes associating a first judgment data that indicates the one or more documents do not belong to any category in at least one of the first hierarchy and the second hierarchy.

35. The computer-readable medium of claim 29, wherein associating judgment data with sets of one or more of said documents includes associating a first judgment data with a first set of one or more documents in the first directory, and associating a second judgment data with a second set of one or more documents in the second directory, wherein the first judgment data is different than the second judgment data.

36. The computer-readable medium of claim 35, wherein the step of generating said second directory is performed at least in part by mapping one or more documents to categories in said second hierarchy based, at least in part, on said second judgment data when said second judgment data conflicts with said first judgment data for said one or more documents.

37. The computer-readable medium of claim 29, the steps further comprising assigning a priority value to at least some of said judgment data that is assigned to different documents.

38. The computer-readable medium of claim 37, wherein the step of associating judgment data with sets of one or more of said documents includes selecting a first judgment data over a second judgment data to be associated with one of said sets based on the priority value of the first judgment data relative to the second judgment data.

39. The computer-readable medium of claim 29, the steps further comprising:
generating a third directory created based on the first directory;
wherein the third directory categorizes said documents based on a third hierarchy of categories;
wherein the step of generating said third directory based on the first directory is performed by mapping said documents to categories in said third hierarchy based, at least in part, on said judgment data; and
wherein the judgment data for generating said third directory is different than the judgment data for generating said second directory.

40. The computer-readable medium of claim 39, wherein in response to one or more changes being made to the first directory, the method further comprises automatically propagating said changes from the first directory to the second directory and to the third directory.

41. A method for categorizing documents in a target directory of hierarchically related categories that includes a first plurality of categories, the method comprising the steps of:
storing a first plurality of user-entered judgments associated with the target directory of hierarchically related categories;
wherein each user-entered judgment of said first plurality of user-entered judgments indicates whether, for the target directory, a particular document belongs to a category of said plurality of categories;
wherein a source directory of hierarchically related categories includes the first plurality of categories;
wherein a plurality of documents are categorized by the source directory within the plurality of categories; and
for each document of said plurality of documents, determining how the target directory should categorize said each document within the plurality of categories based on:
a particular category in which said each document has been categorized by the source directory, and
how a particular user-entered judgment of said first plurality of user-entered judgments indicates said each document belongs to said particular category.

42. The method of claim 41, wherein:
each user-entered judgment of a plurality of user-entered judgments is associated with a certain value reflecting the quality of said user-entered judgment; and
determining how the target directory should categorize said each document is based on the respective certain value of said the particular user-entered judgment.

43. The method of claim 41, wherein:
the steps further include storing a second plurality of user-entered judgments associated with the source directory of hierarchically related categories;
each user-entered judgment of said second plurality of user-entered judgments indicates whether, for the source directory, a particular documents belongs to a category of said plurality of categories; and
determining how the target directory should categorize said each document within the plurality of categories is based on how a particular user-entered judgment of said second plurality of user-entered judgments indicates said each document belongs to said particular category.

44. The method of claim 43, wherein
each user-entered judgment of said first plurality of user-entered judgments and said second plurality of user-entered judgments is associated with a certain value reflecting a weight of said user-entered judgment relative to another user-entered judgment; and
determining how the target directory should categorize said each document within the plurality of categories is based on a comparison of the respective weight of said particular user-entered judgment of said first plurality of user-entered judgments and said particular user-entered judgment of said second plurality of user-entered judgments.

45. The method of claim 41, wherein:
- a mapping maps the hierarchically related categories of said source directory to the hierarchically related categories of said target directory; and
- determining how the target directory should categorize said each document within the plurality of categories is based on the mapping.

46. A computer-readable medium carrying one or more sequences of instructions which, when executed by one or more processors, causes the one or more processors to perform the method recited in claim 41.

47. A computer-readable medium carrying one or more sequences of instructions which, when executed by one or more processors, causes the one or more processors to perform the method recited in claim 42.

48. A computer-readable medium carrying one or more sequences of instructions which, when executed by one or more processors, causes the one or more processors to perform the method recited in claim 43.

49. A computer-readable medium carrying one or more sequences of instructions which, when executed by one or more processors, causes the one or more processors to perform the method recited in claim 44.

50. A computer-readable medium carrying one or more sequences of instructions which, when executed by one or more processors, causes the one or more processors to perform the method recited in claim 45.

* * * * *